(12) United States Patent
Murata et al.

(10) Patent No.: US 8,711,827 B2
(45) Date of Patent: Apr. 29, 2014

(54) MOBILE TERMINAL BASED ON W-CDMA SYSTEM HAVING RECEIVE DIVERSITY FUNCTION AND SYSTEM THEREOF

(75) Inventors: Syuuichi Murata, Kawasaki (JP); Takaharu Nakamura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 934 days.

(21) Appl. No.: 11/987,221

(22) Filed: Nov. 28, 2007

(65) Prior Publication Data
US 2008/0259893 A1 Oct. 23, 2008

Related U.S. Application Data

(63) Continuation of application No. PCT/JP2006/309009, filed on Apr. 28, 2006.

(51) Int. Cl.
*H04B 7/216* (2006.01)

(52) U.S. Cl.
USPC ........... 370/342; 370/320; 370/335; 455/135; 455/101; 455/277.1; 375/147; 375/130; 375/136; 375/150; 375/142

(58) Field of Classification Search
None
See application file for complete search history.

(56) References Cited

U.S. PATENT DOCUMENTS

| | | | |
|---|---|---|---|
| 5,940,452 A | 8/1999 | Rich | |
| 6,438,362 B1 * | 8/2002 | Amezawa | 455/226.3 |
| 6,438,377 B1 * | 8/2002 | Savolainen | 455/439 |
| 6,973,119 B2 * | 12/2005 | Yotsumoto | 375/147 |
| 7,024,168 B1 * | 4/2006 | Gustafsson et al. | 455/135 |
| 7,463,704 B1 * | 12/2008 | Tehrani et al. | 375/345 |
| 2003/0072396 A1 | 4/2003 | Binshtok et al. | |
| 2004/0179544 A1 * | 9/2004 | Wilson et al. | 370/442 |
| 2005/0213687 A1 * | 9/2005 | Matsui et al. | 375/316 |
| 2007/0018883 A1 * | 1/2007 | Hester et al. | 342/92 |
| 2007/0115801 A1 * | 5/2007 | Li et al. | 370/208 |

FOREIGN PATENT DOCUMENTS

| | | |
|---|---|---|
| CN | 1674568 | 9/2005 |
| GB | 2384651 A | 7/2003 |
| JP | 11237419 | 8/1999 |
| JP | 2002171210 | 6/2002 |
| JP | 2005-277767 | 10/2005 |
| JP | 2005-341366 | 12/2005 |
| WO | 9939457 | 8/1999 |
| WO | 2005084379 A2 | 9/2005 |

OTHER PUBLICATIONS

Office Action issued in corresponding KR patent application 10-2007-7029305 dated Nov. 30, 2009.
Office Action issued in corresponding JP patent application No. 2007-534929 dated Mar. 30, 2010.
Office Action issued in corresponding KR patent application No. 10-2010-7004304 dated Jul. 27, 2010.
Korean Office Action issued in Korean Patent Application (dated Jun. 24, 2009).

(Continued)

*Primary Examiner* — Dady Chery
(74) *Attorney, Agent, or Firm* — Smith, Gambrell & Russell, LLP

(57) ABSTRACT

A mobile terminal having a receive diversity function using a plurality of receive antennas, having a calculation section which combines respective level measurement results of the receive antennas and calculates a level measurement value after being combined as the level measurement result of the mobile terminal.

13 Claims, 20 Drawing Sheets

(56) References Cited

OTHER PUBLICATIONS

3GPP TS 25.215, Technical Specification Group Radio Access Network; Physical layer—Measurements (FDD); (Release 7), V7.0.0, (Mar. 2006), pp. 1-18.

3GPP TS 25.101, Technical Specification Group Radio Access Network; User Equipment (UE) radio transmission and reception (FDD), (Release 7), V7.3.0, (Mar. 2006), pp. 1-140.

Koji Ohno et al., Reverse-Link Capacity and Transmit Power in a Power-Controlled Cellular DS-CDMA System, BII, vol. J79-B0II, No. 1, pp. 17-25, Jan. 1996, with translation.

International Search Report dated Aug. 1, 2006.

Chinese Office Action dated Feb. 24, 2011 issued in application No. 200680022846.9.

Extended European Search Report dated Jan. 23, 2012 received in Application No. 06745868.7-2411/2015474.

3rd Generation Partnership Project; Technical Specification Group Radio Access Network; Physical layer—Measurements (FDD) (Release 7) 3GPP Standard; 3GPP TS 25.215, 3rd Generation Partnership Project (3GPP), No. V7.0.0, Mar. 1, 2006, p. 1-18, XP050366931 Chapters 5.2.1 and 5.2.2; p. 11.

3rd Notification of Office Action dated Jun. 27, 2012 received in China Patent Application No. 200680022846.9.

4th Notification of Office Action dated Dec. 6, 2012 issued in the corresponding Chinese Patent Application No. 200680022846.9.

\* cited by examiner

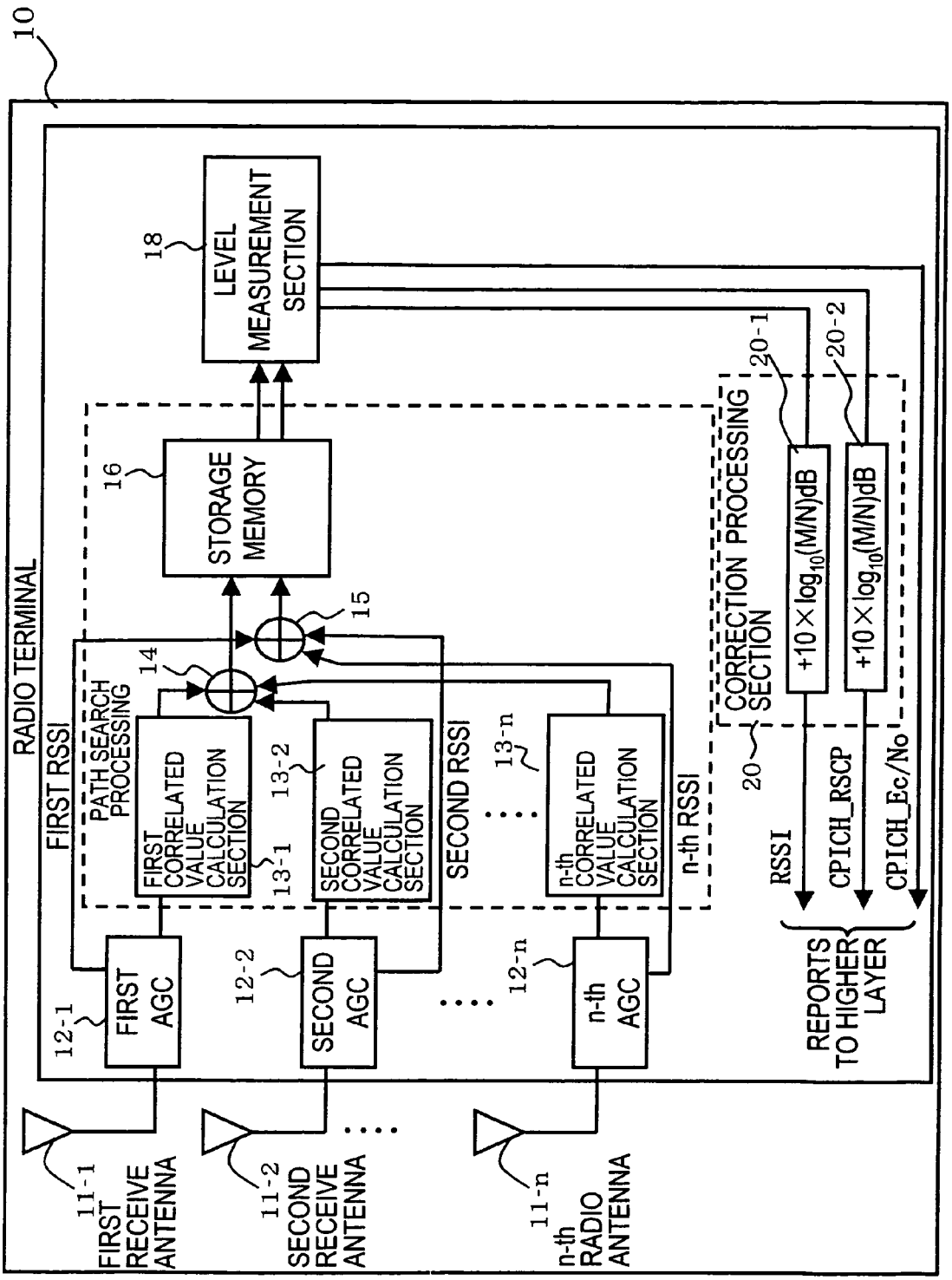

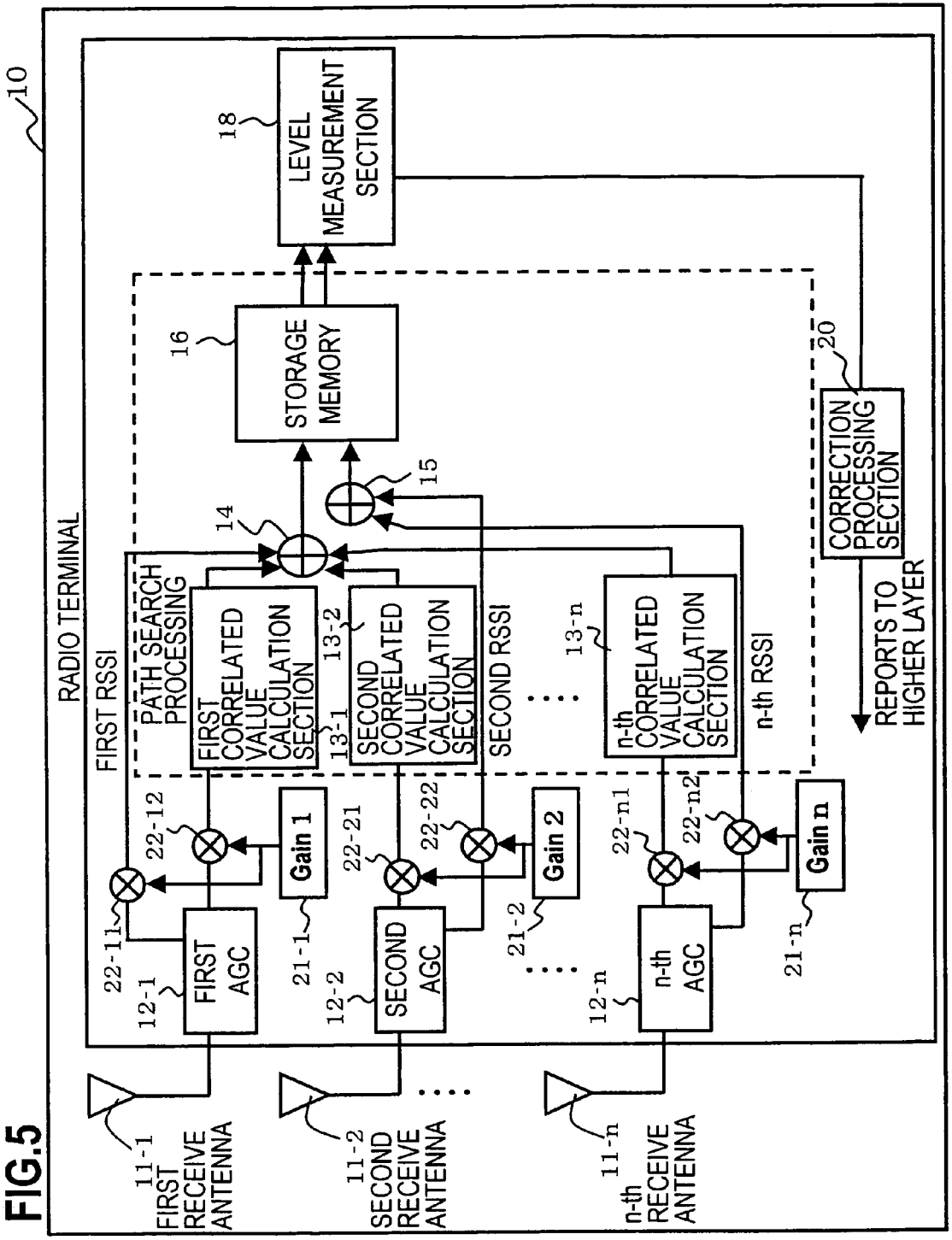

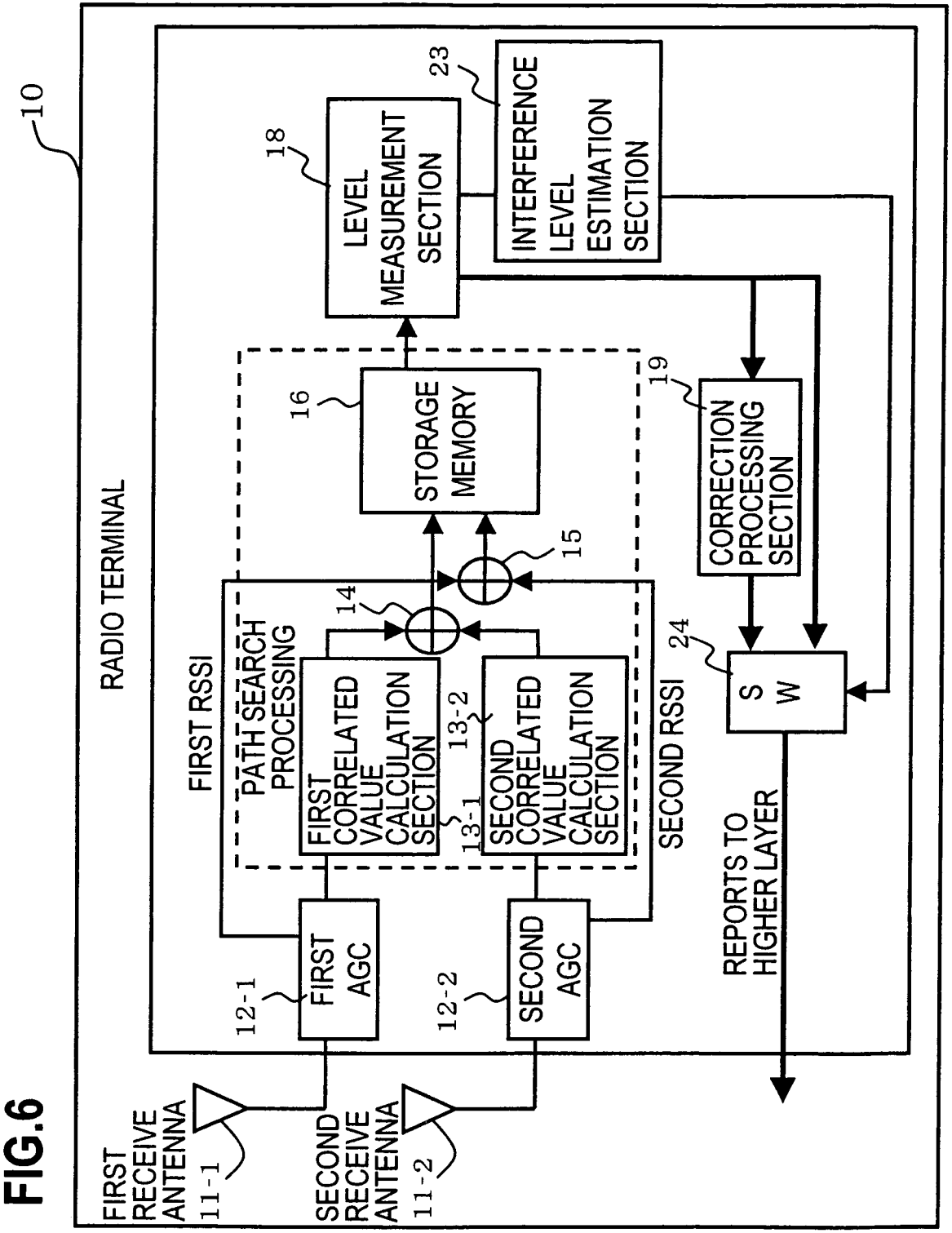

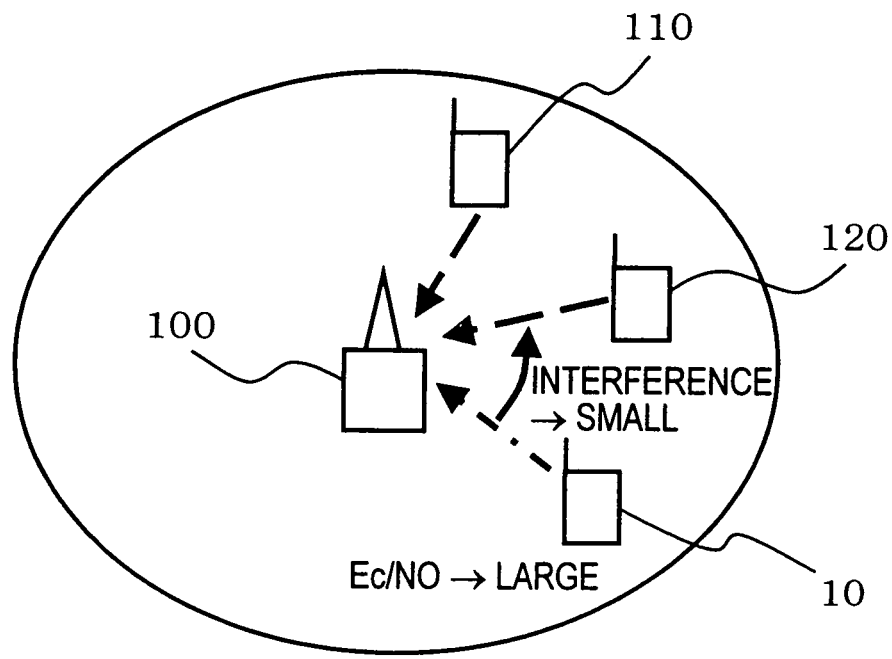
FIG.7 (A) EXAMPLE OF EFFECT OF EMBODIMENT 5
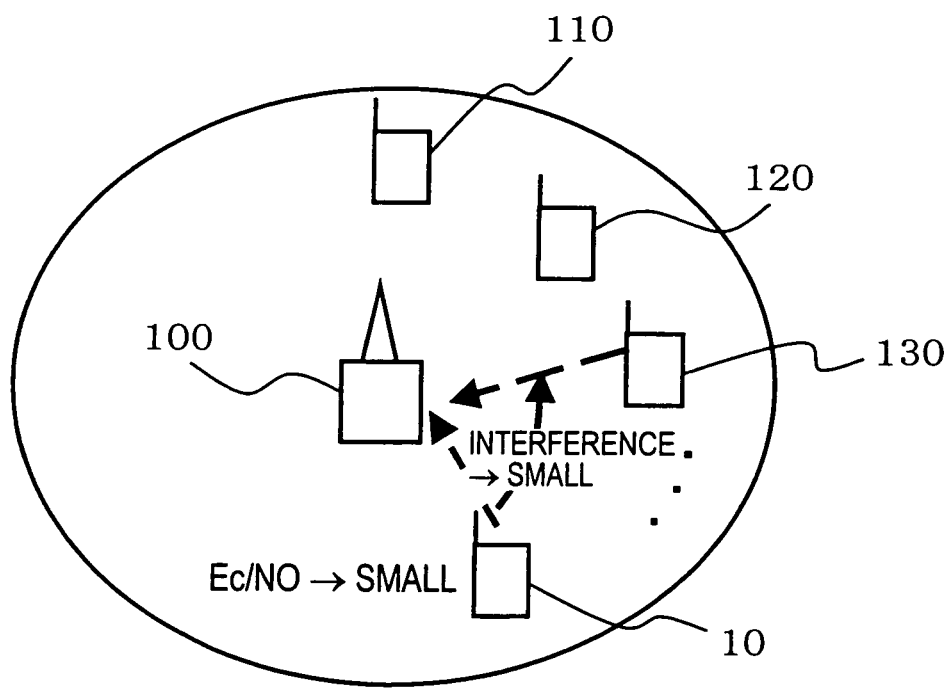
FIG.7 (B) EXAMPLE OF EFFECT OF EMBODIMENT 5

FIG.14(A) EXAMPLE OF THRESHOLD SELECTION

FIG.14(B) EXAMPLE OF CONCEPT OF FIRST AND SECOND THRESHOLDS

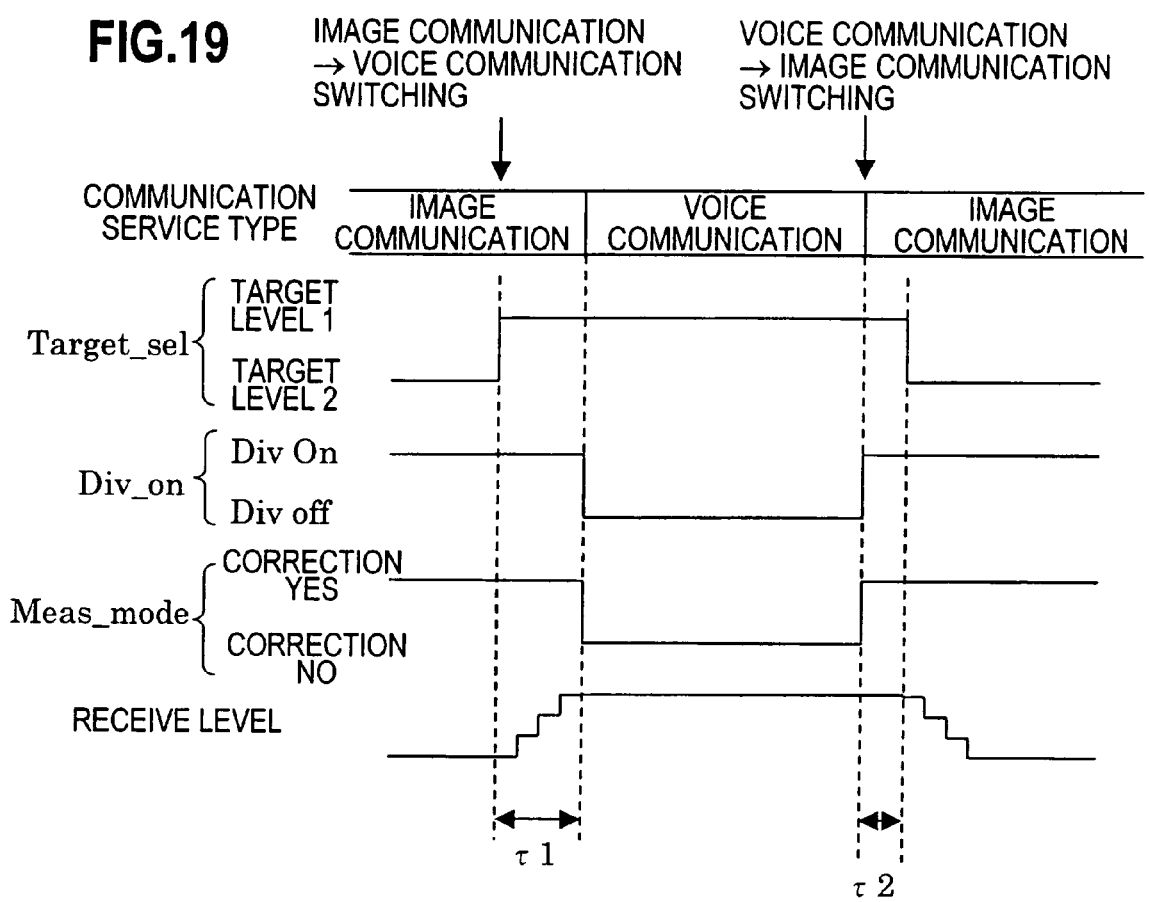

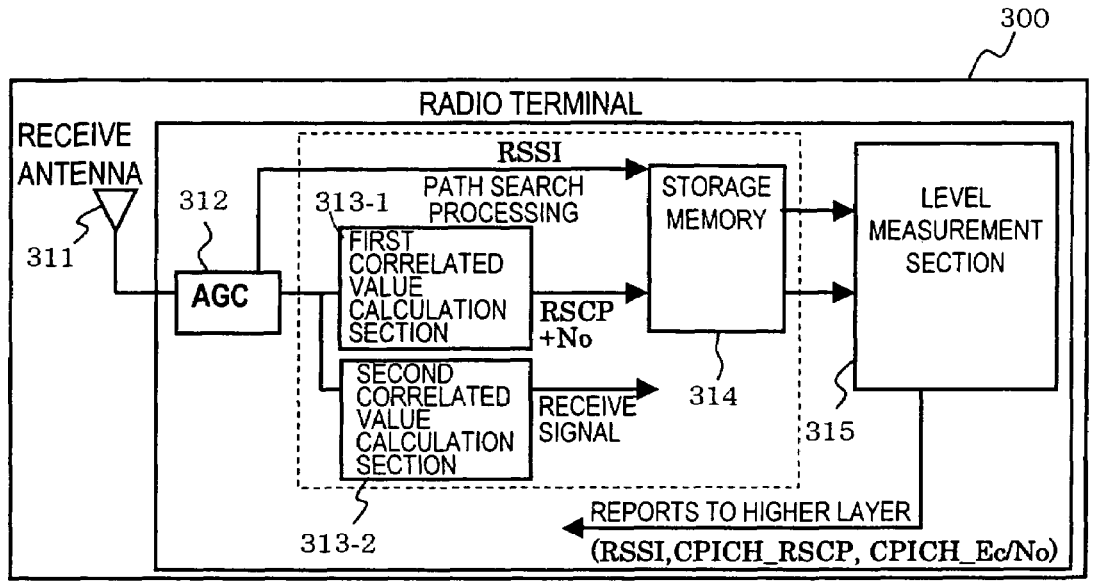
FIG.20 (A) CONFIGURATION EXAMPLE OF CONVENTIONAL MOBILE UNIT (SINGLE ANT)
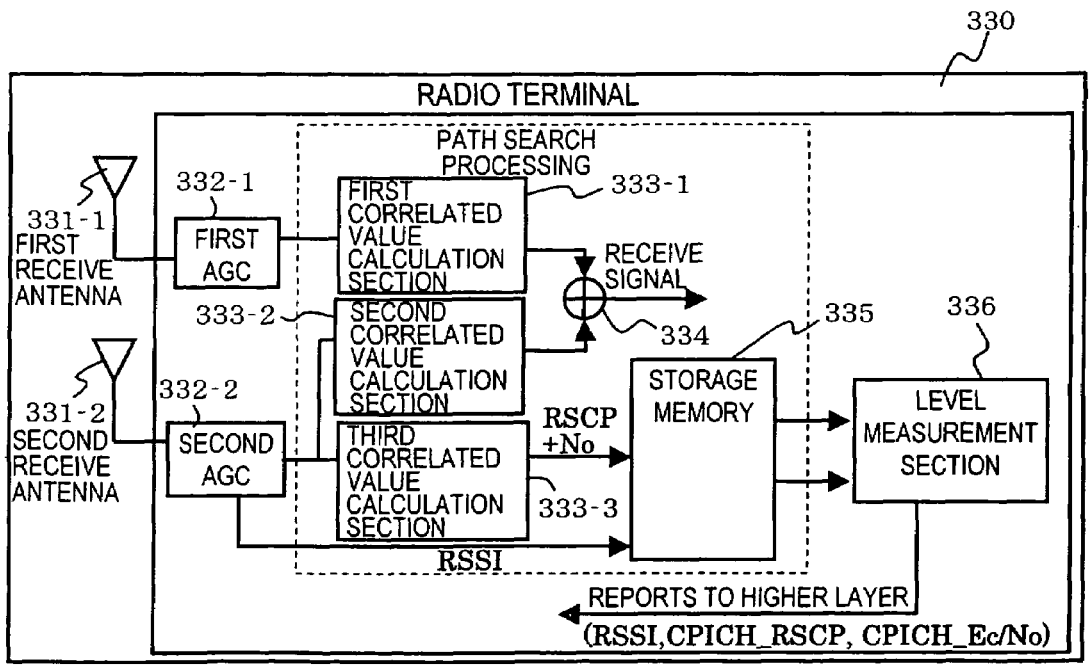
FIG.20 (B) CONFIGURATION EXAMPLE OF CONVENTIONAL MOBILE UNIT (WITH DIVERSITY FUNCTION)

MOBILE TERMINAL BASED ON W-CDMA SYSTEM HAVING RECEIVE DIVERSITY FUNCTION AND SYSTEM THEREOF

CROSS REFERENCE TO RELATED APPLICATIONS

This application is a continuation of International Application No. PCT/JP2006/309009, filed on Apr. 28, 2006, now pending, herein incorporated by reference.

TECHNICAL FIELD

The present invention relates to a mobile terminal based on a W-CDMA system having a receive diversity function and a system thereof, and more particularly to a mobile terminal or the like in which the level measurement report value is optimized.

BACKGROUND ART

Generally in a W-CDMA (Wideband-Code Division Multiple Access) system, a plurality of mobile terminals share a same radio frequency by code division multiplexing, and communicate in a radio cell area covered by one radio base station.

In this W-CDMA system, mutual interference by communication radio waves between mobile terminal increases as the number of mobile terminals accommodated and communicating in a same radio cell area increases. Therefore it is known that the number of mobile terminals (capacity) accommodated in a cell and the communication quality are in a trade-off relationship (see Non-patent Document 1 herein below).

As a consequence, in order to insure the capacity of an entire system and the communication quality for each user, it is important to perform appropriate controls, such as controlling the transmission power so that the communication power between the mobile terminal and a base station reaches the minimum according to the line status, or shutting communication OFF in an outside service area ("outside area") if the mobile terminal communicating near a boundary of the radio cell area moves outside the cell area.

The mobile terminal is also demanded to perform various judgments related to a signal level of receive signals, and judge whether the mobile terminal is in an "outside area" or an "inside area" based on the result.

3GPP (3$^{rd}$ Generation Partnership Project), which specifies the radio standards for W-CDMA, defines three types of signal measurements as shown below (e.g. see Non-patent Document 2, Chapter 5.1 herein below).

(1) CPICH_RSCP (Common Pilot Channel_Received Signal Code Power): receive code power of the Primary CPICH (Primary pilot signal) measured by the mobile terminal, (2) RSSI (Received Signal Strength Indicator): total power in a receive band measured by the mobile terminal, including both desired waves and interference waves, and (3) CPICH_Ec/NO (Energy per chip/Noise Power): ratio of power per CPICH chip and total power per chip measured by the mobile terminal.

FIG. 20(A) shows a configuration example of a conventional W-CDMA mobile terminal (single antenna receiving) using these three types of signals.

A mobile terminal 300 has a receive antenna 311, an AGC (Automatic Gain Control) amplifier section 312, a first and second correlated value calculation sections 313-1 and 313-2, a storage memory 314, and a level measurement section 315.

A receive signal received by the receive antenna 311 is amplified to an appropriate signal level by the AGC section 312, and is input to the first and second correlated value calculation sections 313-1 and 313-2.

The second correlated value calculation section 313-2 calculates a correlated value using a diffusion code assigned to the receive signal. A necessary signal processing is performed on the output, and the receive signal is decoded.

The first correlated value calculation section 313-1, on the other hand, calculates a correlated value using a diffusion code assigned to a code channel which performs level measurement. This output is CPICH_RSCP+NO (NO is noise power). This value is stored in the storage memory 314 once.

In the AGC section 312, the control voltage thereof is in proportion to the signal level (RSSI) of the receive signal, so RSSI can be calculated. The calculated RSSI is also stored in the storage memory 314 once.

In the level measurement section 315, RSSI and CPICH_RSCP+NO are read from the storage memory 315, CPICH_RSCP is determined by subtracting the noise power NO from CPICH_RSCP+NO, and CPICH_Ec/NO is calculated by dividing CPICH_RSCP by RSSI.

The level measurement section 315 outputs (reports) the calculated CPICH_RSCP, CPICH-Ec/NO, and the RSSI read from the storage memory 314, to a higher layer. These three types of levels are used for Judging the "outside area" and "inside area" of the mobile terminal.

Definitions of the port on these three types of levels are specified in Non-patent Document 2, Chapter 5.1 herein below, but there is no statement on a particular specification considering receive diversity.

FIG. 20(B) shows a configuration example of a W-CDMA mobile terminal having a receive diversity function which could be implemented based on the configuration in FIG. 20(A).

A mobile terminal 330 has a first and second receive antennas 331-1 and 331-2, a first and second AGC sections 332-1 and 332-2, a first to third correlated value calculation sections 333-1 to 333-3, a combining section 334, a storage memory 335 and a level measurement section 336.

The receive signals received by the first and second receive antennas 331-1 and 331-2 are input to the first and second correlated value calculation sections 333-1 and 333-2 via the first and second AGC sections 332-1 and 332-2 respectively.

The first and second correlated value calculation sections 333-1 and 333-2 calculate correlated values (receive signals) respectively using diffusion codes, and the combining section 334 combines the outputs. Details on combining receive signals is stated in Non-patent Document 3, Chapter 7.2 herein below, for example. A composite signal is decoded by the decoding processing in subsequent stages, just like FIG. 20(A).

The second AGC section 332-2, on the other hand, outputs RSSI in the same way based on the control information. The receive signal that is output from the second AGC section 332-2 is also input to the third correlated value detection section 333-3, and RSCP+NO is output from the third correlated value detection section 333-3 in the same way as FIG. 20(A).

In the storage memory 335, RSCP+NO and RSSI, with respect to the receive signal received by the second receive antenna 331-1, are stored. The level measurement section 336 performs operation based on each value stored in the storage memory 335, and reports RSSI, CPICH_RSCP and CPICH_Ec/NO to a higher layer.

Non-patent Document 1: Ohno, Adachi: "Uplink capacity and transmission power of DS-CDMA", Shingakuron B-II, VOL. J79-B-II, pp. 17-25, 1996-01

Non-patent Document 2: 3GPP TS 25.215V7.0.0 (2006-03): "Physical layer—Measurement (FDD)".

Non-patent Document 3: 3GPP TS 25.101V7.3.0 (2006-03): "User equipment (UE) ratio transmission and reception (FDD)".

DISCLOSURE OF THE INVENTION

The mobile terminal having the receive diversity function shown in FIG. 20, however, combines receive signals by the combining section 334 to improve the quality of the receive signals, but the level measurement values, such as CPICH_RSCP and RSSI, used for judgment of an "outside area" and "inside area", are measured only in a branch to which the second receive antenna 331-2 is connected.

Therefore the judgment result may be "outside area" even in a communicable area, because the measurement results of CPICH_RSCP and RSSI, at the branch to which the second receive antenna 331-2 is connected, are low, although the combined receive signal has sufficient quality. If the mobile terminal is judged as in the "outside area", the number of mobile terminals to be accommodated by one base station decreases, which makes it impossible to appropriately increase the number of units to be accommodated.

If the mobile terminal of which level of measurement result of RSSI etc. is increased by adding some function, in order to prevent a drop in the level of measurement result, on the other hand, this mobile terminal can communicate even in an area outside an area where communication is impossible, and this communication interferes with other mobile terminals unnecessarily, and deteriorates communication quality.

With the foregoing in view, it is an object of the present invention to provide a mobile terminal and a system thereof which can appropriately increase the number of mobile terminals accommodated by one base station in a W-CDMA system, while maintaining communication quality.

To achieve the above object, one aspect of the present invention provides a mobile terminal having a receive diversity function using a plurality of receive antennas, having a calculation section which combines respective level measurement results of the receive antennas and calculates a level measurement value after being combined as the level measurement result of the mobile terminal.

Another aspect of the present invention provides the mobile terminal further having a correction section which regards a level measurement value after converting the level measurement result of the mobile terminal calculated by the calculation section into a value based on one antenna branch as the level measurement result, when the number of receive antennas is two.

Another aspect of the present invention provides the mobile terminal further having a correction section which regards a level measurement value after converting the level measurement result of the mobile terminal calculated by the calculation section into a value based on M ($1 \leq M \leq N$) number of antenna branches, that is, the number of receive antennas based on which a cell design of a system including a base station is performed, as the level measurement result of the mobile terminal, when the number of the receive antennas is N ($N>2$).

Another aspect of the present invention provides the mobile terminal further having a multiplication section which weights a signal received by the receive antenna before being combined, wherein the calculation section combines the level measurement result with the signal after multiplication.

Another aspect of the present invention provides the mobile terminal, wherein the multiplication section performs different weighting according to a type of each of the receive antennas, or a gain difference between the receive antennas.

Another aspect of the present invention provides the mobile terminal further having a selection section which selects one of the corrected level measurement result from the correction section and the uncorrected level measurement result from the calculation section, according to a receive environment of the receive antenna.

Another aspect of the present invention provides the mobile terminal, wherein the receive environment of the receive antenna is a level of interference in a cell, and the selection section selects the level measurement result after correction when the interference is higher than a predetermined level, and selects the uncorrected level measurement result when the interference is at a predetermined level or less.

Another aspect of the present invention provides the mobile terminal further having a control section which turns the receive diversity function ON or OFF according to a type of the receive signal, and selects one of the level measurement result from the correction section and the level measurement result from the calculation section.

Another aspect of the present invention provides the mobile terminal further having a control section which turns the receive diversity function ON or OFF according to a frequency band to be received, and selects one of the level measurement result from the correction section and the level measurement result from the calculation section.

Another aspect of the present invention provides the mobile terminal further having a control section which turns the receive diversity function ON or OFF according to a service type of communication, and selects one of the level measurement result from the correction section and the level measurement result from the calculation section.

Another aspect of the present invention provides the mobile terminal, wherein the ON or OFF of the receive diversity function, the presence or absence of the correction, a correction coefficient to be used for correction if the correction is performed, and a weight coefficient if weighting is performed for a signal received from receive antenna before being combined, is reported to a base station along with the level measurement result.

Another aspect of the present invention provides the mobile terminal, wherein a threshold to be used for judging whether the mobile terminal is in an "inside area" or "outside area" is switched, depending on the ON or OFF of the receive diversity function.

Another aspect of the present invention provides the mobile terminal, wherein a threshold to be used for judging whether handover is activated is switched, depending on the ON or OFF of the receive diversity function.

Another aspect of the present invention provides the mobile terminal further having a power control information generation section which requests a base station for the difference up to a target receive level of the mobile terminal as power control information, depending on the ON or OFF of the receive diversity function based on a service type of communication.

Another aspect of the present invention provides the mobile terminal further having a power control information generation section which requests a base station for the difference up to the target receive level of the mobile terminal as power control information, wherein the receive diversity function is turned ON or OFF according to a service type of communication after the request of the power control information.

To achieve the above object, another aspect of the present invention provides a system having a mobile terminal having a receive diversity function using a plurality of receive antennas; and a base station which communicates with the mobile station, wherein the mobile terminal further having a calculation section which combines respective level measurement results of the receive antennas and calculates the level measurement value after being combined as the level measurement result of the mobile terminal; a correction section which corrects the level measurement result of the mobile terminal to a level measurement result converted into a value based on at least one antenna branch; and a selection control section which turns the receive diversity function ON or OFF according to a receive frequency band to be received, and selects one of the level measurement result corrected by the correction section and the uncorrected level measurement result from the calculation section, and the base station further having a frequency band specification section which specifies a receive frequency band to the mobile terminal; and a switching section which switches a threshold used for judging handover or activation of call termination for the mobile terminal according to the specified frequency band.

To achieve the above object, another aspect of the present invention provides a system having a mobile terminal having a receive diversity function using a plurality of receive antennas; and a base station which communicates with the mobile station, wherein the mobile terminal further having a calculation section which combines respective level measurement results of the receive antennas and calculates the level measurement value after being combined as the level measurement result of the mobile terminal; a correction section which corrects the level measurement result of the mobile terminal to a level measurement result converted into a value based on at least one antenna branch; a selection control section which turns the receive diversity function ON or OFF according to a receive frequency band to be received, and selects one of the level measurement result corrected by the correction section and the uncorrected level measurement result from the calculation section; and a mobile terminal side radio control section which reports a measurement mode which indicates the ON or OFF of the receive diversity function or the presence or absence of correction for the level measurement result to the base station, and the base station further having a switching section which switches a threshold used for judging handover or activation of call termination for the mobile terminal according to the measurement mode from the mobile terminal side radio control section.

According to the present invention, a mobile terminal and a system thereof, which can appropriately increase the number of mobile terminals accommodated by one base station in a W-CDMA system, while maintaining communication, are provided.

BRIEF DESCRIPTION OF THE DRAWINGS

FIG. 4 is a diagram depicting another configuration example of the mobile terminal;

FIG. 5 is a diagram depicting another configuration example of the mobile terminal;

FIG. 6 is a diagram depicting another configuration example of the mobile terminal;

FIG. 7(A) and FIG. 7(B) are diagrams depicting the effect of Embodiment 5;

FIG. 19 is a diagram depicting a switching timing; and

FIG. 20(A) and FIG. 20(B) are diagrams depicting configuration examples of a conventional mobile terminal.

BEST MODE FOR CARRYING OUT THE INVENTION

Best mode for carrying out the present invention will now be described.

Embodiment 1

Figure 1:
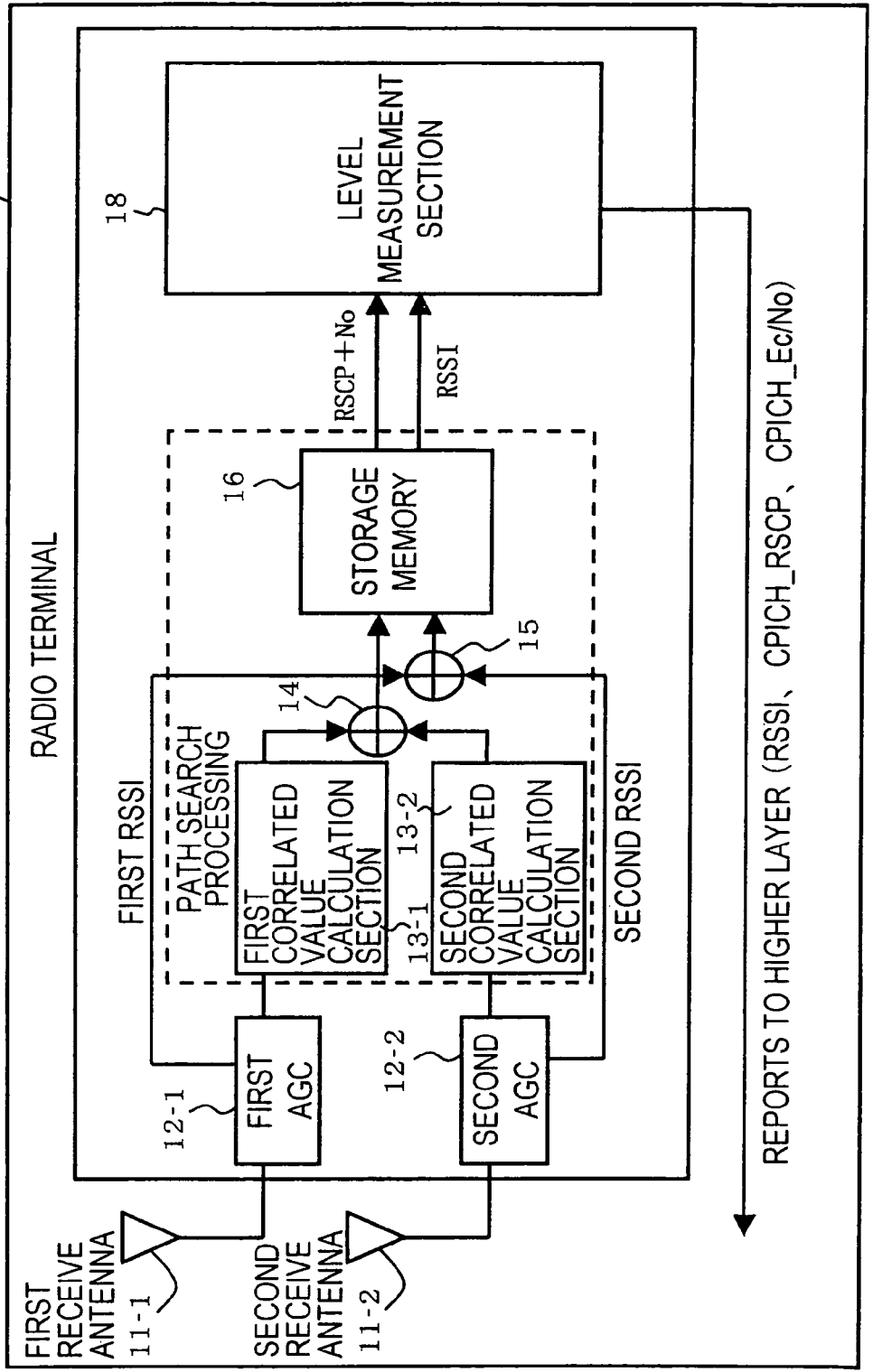
FIG. 1 is a diagram depicting a configuration example of the mobile terminal.

FIG. 1 is a diagram depicting a configuration example of a mobile terminal 10 according to Embodiment 1.

The mobile terminal 10 has a first and second receive antennas 11-1 and 11-2, a first and second AGC sections 12-1 and 12-2, a first and second correlated value calculation sections 13-1 and 13-2, a first and second combining sections 14 and 15, a storage memory 16, and a level measurement section 18. The mobile terminal 10 shown in FIG. 1 has a receive diversity function using the two receive antennas 11-1 and 11-2.

The receive signals received by the first and second receive antennas 11-1 and 11-2 are input to the first and second AGC sections 12-1 and 12-2 respectively. The first and second AGC sections 12-1 and 12-2 amplify the receive signals, and output the amplified receive signals to the first and second correlated value calculation sections 13-1 and 13-2 respectively.

The first and second correlated value calculation sections 13-1 and 13-2 compute CPICH_RSCP+NO respectively, which is a correlated value, using a diffusion code assigned to a code channel for which level measurement is performed. The values after computation are combined by the first combining section 14, and are stored in the storage memory 16.

The first and second AGC sections 12-1 and 12-2, on the other hand, compute the first and second RSSI respectively using the fact that the control voltage, used for feedback control inside, is in proportion to RSSI. The first and second RSSIs are combined by the second combining section 15, and are stored in the storage memory 16.

The combined CPICH_RSCP+NO and RSSI are stored in the storage memory 16. The level measurement section 18 reads these values from the storage memory 16, computes CPICH_RSCP by subtracting noise power NO from CPICH_RSCP+NO, and computes CPICH_Ec/NO by dividing the computed CPICH_RSCP by RSSI (or by subtracting RSSI from the computed CPICH_RSCP).

Then the level measurement section 18 outputs (reports) the computed CPICH_RSCP, CPICH_Ec/NO, and the RSSI read from the storage memory 16, to the higher layer (e.g. radio control sections at the mobile terminal 10 side) as the level measurement result. For example, the level measurement section 18 computes these values periodically, and outputs them to the higher layer.

As described above, according to Embodiment 1, the result of combining (adding) the three types of signal levels (RSSI, CPICH_RSCP, and CPICH_Ec/NO) in each branch is used as the level management result. Therefore the value of the measurement result is greater than the three types of the respective signal levels by signal antennas for the combined amount, so if this large value is reported to the base station as the level report, the time for the mobile terminal 10 to be in an "inside area" becomes long. As a result, the mobile terminal 10 which has the receive diversity function can report an appropriate receive value corresponding to the receive signal, and is not judged as in the "outside area" in an area where the communication quality of the receive signal is good, and quality can be maintained.

Also it is not judged as in the "outside area" inappropriately, so the number of mobile terminal s to be accommodated by one base station is not decreased, but can be increased appropriately.

Embodiment 2

Figure 2:
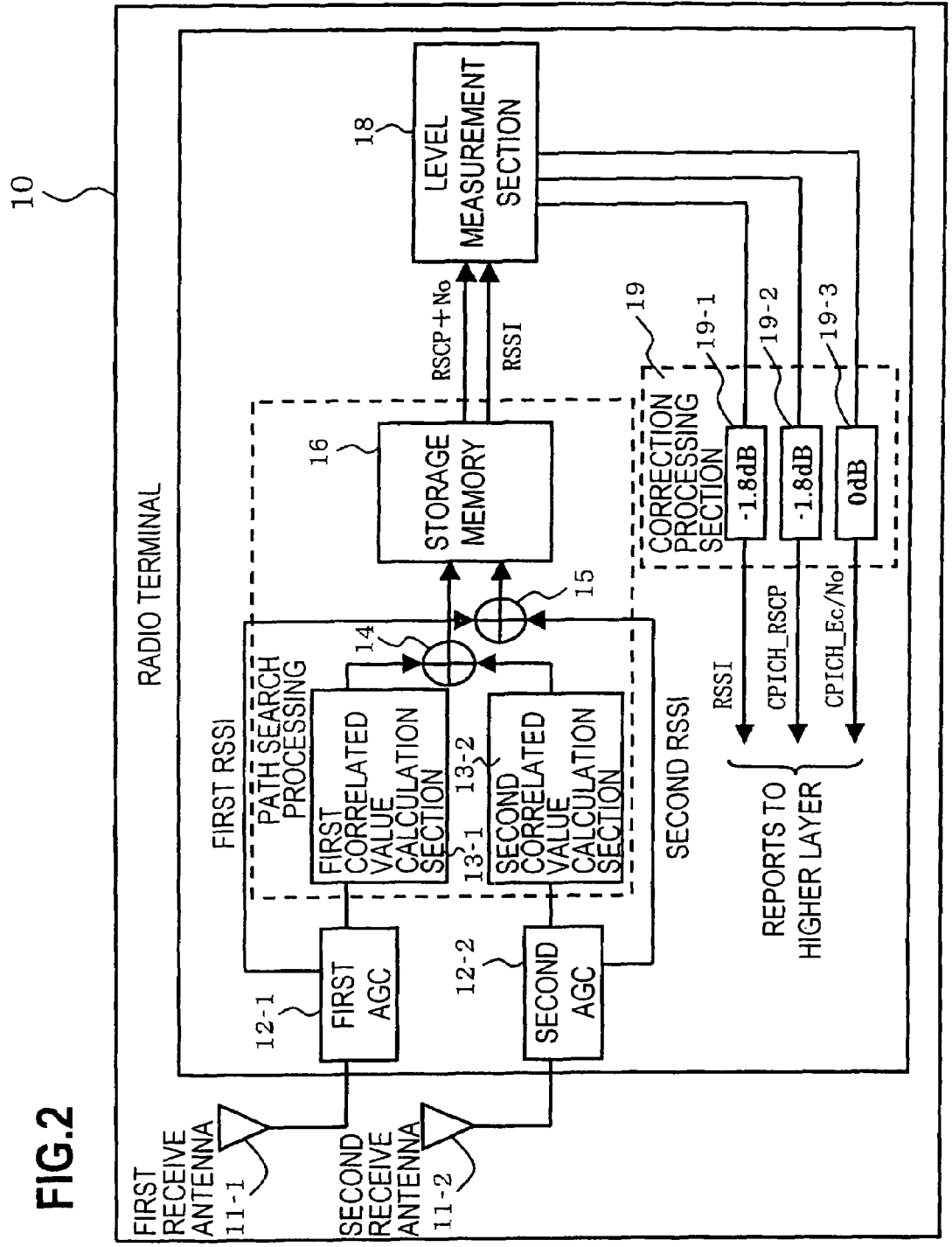
FIG. 2 is a diagram depicting another configuration example of the mobile terminal.

Now Embodiment 2 will be described. FIG. 2 shows a configuration example of a mobile terminal 10 according to Embodiment 2. The configuration of a first and second receive antennas 11-1 and 11-2 to a level measurement section 18 of Embodiment 2 is the same as that of Embodiment 1.

In the mobile terminal 10 shown in FIG. 2, a correction processing section 19 is added to the mobile terminal 10 shown in FIG. 1, which reports a lever measurement result converting into a value based on "1" antenna branch, considering the gain difference of the two receive antennas 11-1 and 11-2, with respect to three types of level measurement results (RSSI, CPICH_RSCP and CPICH_Ec/NO) which are output from the level measurement section 18.

In the case of the mobile terminal 10 with a receive diversity function using two receive antennas 11-1 and 11-2, a combined level measurement result is reported to a base station as "2 antennas" at level report. In this case, the communication quality of the mobile terminal 10 is assured, but interference of communication radio waves may occur to other mobile terminals existing in the same receive area.

Therefore in Embodiment 2, the mobile terminal 10 with the receive diversity functions reports the level converting into the value of virtual "1" antenna branch by amending to the revel measurement value. As a result, the generation of interference with other mobile terminals can be prevented, and communication quality can be maintained.

In the case of converting into the value based on the "1" antenna branch, however, if half a value of each level measurement result is reported, the mobile terminal 10 with the receive diversity function may be judged as in an "outside area" even if it exists in a communication possible area, since the level to be reported is low. Therefore the mobile terminal 10 must report the level measurement result as a value converting into the value base on the "1" antenna branch, considering the gain difference of the receive antennas 11-1 and 11-2.

Figure 3:
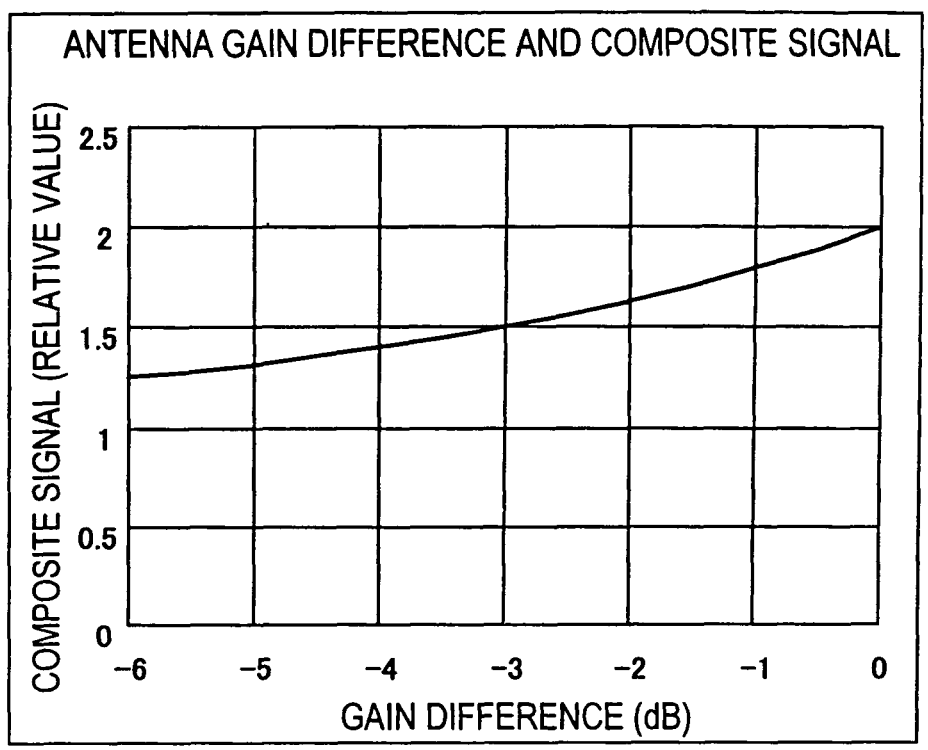
FIG. 3 is a diagram depicting a relationship between a gain difference of antennas and a composite signal.

FIG. 2 shows an example when the gain difference between the first and second receive antennas 11-1 and 11-2 is "3 dB". FIG. 3 shows the calculation result depicting the relationship between the gain difference of the antennas and the composite signal. If the gain difference is "3 dB", as shown in FIG. 3, the composite signal has a signal level that is 1.5 times the original signal (equivalent to 1.8 dB).

Therefore a first correction section 19-1 included in the correction processing section 19 performs processing to subtract "1.8 dB" from the combined RSSI (processing to multiply "⅔" in the case of an anti-logarithm, that is the same for the following description). A second correction section 19-2 performs processing to subtract "1.8 dB" from CPICH_RSCP.

The value of CPICH-Ec/NO is determined by CPICH_RSCP and RSSI (division or subtraction). Since "1.8 dB" is subtracted for CPICH_RSCP and RSSI, correction processing is unnecessary for the value of CPICH_Ec/NO ("0 dB" is added by a third correction section 19-3).

For example, in the case of processing by a logarithm, CPICH_Ec/NO is determined by the following subtraction: CPICH_Ec/NO=CPICH_RSCP−RSSI. Since "1.8 dB" is subtracted from CPICH_RSCP and RSSI when correction is performed, this expression becomes CPICH_Ec/NO= (CPICH_RSCP−1.8 dB)−(RSSI−1.8 dB), and as a result, correction processing is unnecessary for CPICH_Ec/NO.

By reporting the three types of level measurement results after correction to the higher layer, the level report using the converted value based on the "1" antenna branch can be performed considering the gain difference of the receive antennas 11-1 and 11-2, therefore being judged as in the "outside area" due to the reporting of low level can be prevented, and the number of mobile terminals to be accommodated by one base station can be appropriately increased, just like Embodiment 1. Also the level is reported after being converted into the value based on the "1" antenna branch, the generation of interference with other mobile terminals can be prevented even for the mobile terminal 10 with the receive diversity function, and communication quality can be maintained.

For the correction processing by the third correction section 19-3, a value other than "0 dB" may be added, or the third correction section 19-3 may be deleted so that CPICH_Ec/NO, to be output from the level measurement section 18, is output as is without performing correction processing. In this case as well, a functional effect similar to the above example can be implemented.

Embodiment 3

Now Embodiment 3 will be described. FIG. 4 shows a configuration example of a mobile terminal 10 according to Embodiment 3.

According to Embodiment 2 (FIG. 2), in the mobile terminal 10 with the receive diversity function using the two receive antennas 11-1 and 11-2, the level is converted into the value based on the "1" antenna branch and reported. According to Embodiment 3, in the mobile terminal 10 with the receive diversity function using N number of receive antennas, the level is virtually converted into a value based on "M" (1≤M≤N) antenna branches and reported.

The receive signals received by the N number of receive antennas 11-1 to 11-*n* are amplified by the first to nth AGC sections 12-1 to 12-*n* respectively. Then each RSCP+NO is calculated in the first to n-th correlated value calculation sections 13-1 to 13-*n* respectively, and combined by the first combining section 14.

The first to n-th AGC sections 12-1 to 12-*n* output RSSIs respectively, and the second combining section 15 combines each RSSI.

Just like Embodiment 1, the combined RSSI and RSCP+NO are stored in the storage memory 16, and the level measurement section 18 outputs three types of level measurement results (RSSI, CPICH_RSCP, and CPICH_Ec/NO).

Just like Embodiment 2, a correction processing section 20 is provided for the output from the level measurement section 18, where processing to add "$10 \times \log_{10}$ (M/N) dB" is performed as the conversion into the virtual value based on M number of antenna branches. In other words, a third and fourth correction sections 20-1 and 20-2 add "$10 \times \log_{10}$ (M/N) dB" to RSSI and CPICH_RSCP output from the level measurement section 18.

CPICH-Ec/NO is reported to the higher layer without performing correction processing, for the same reason as Embodiment 2. The processing to add "0 dB" may certainly be performed.

In Embodiment 3 as well, if there is a gain difference between N number of receive antennas 11-1 to 11-*n*, "$10 \times \log_{10}$(M/N) dB" to be added is a value in consideration of these gains, just like Embodiment 2, so inappropriate judgment of the "outside area" can be prevented, and the number of mobile terminals to be accommodated by one base station can be appropriately increased. Just like Embodiment 2, the level is virtually converted into the value based on M antenna branches, and is reported, therefore interference with other mobile terminals can be prevented, and communication quality can be maintained.

"M" is a number of antennas based on which cell of a system is designed. For example, if it is assumed that a mobile terminal to be accommodated by the system has two antennas, the level is converted into a value based on two antennas, and is reported. "M" can also be the number of receive antennas based on which level is reported. The above mentioned Embodiment 2 can be recognized as an example of cell design assuming that the mobile terminal has "one antenna".

Embodiment 4

Now Embodiment 4 will be described. FIG. 5 shows a configuration example of a mobile terminal 10 according to Embodiment 4. Gain storage sections 21-1 to 12-*n* for storing a weight coefficient (Gain 1 to Gain n) and multiplication sections 22-11 to 22-*n*2 for multiplying a weight coefficient, for the respective outputs of the first to n-th AGC sections 12-1 to 12-*n*, are added to the configuration in FIG. 4.

In the mobile terminal 10 with the receive diversity function using N number of receive antennas 11-1 to 11-*n*, RSSI which is output from each AGC sections 12-1 to 12-*n* and an amplified receive signal are multiplied by a weight coefficient respectively. After multiplication, each RSSI is combined with the first combining section 14, and the receive signal after amplification is input to each correlated value calculation section 13-1 to 13-*n*. The processing thereafter is the same as Embodiment 3.

This weight coefficient is an inverse number of the gain of each receive antenna 11-1 to 11-*n*. Therefore in Embodiment 4, the level measurement results (RSSI, CPICH_RSCP, and CPICH_Ec/NO) can be determined after correcting the gain difference among the receive antennas 11-1 to 11-*n*.

Such the gain difference may be generated between an external whip antennas and an antenna embedded in the substrate. This is the same for such embodiments as Embodiment 2.

In Embodiment 4 as well, the correction processing section 20 performs correction processing on the level measurement result, which is output from the level measurement section 18, just like Embodiment 3, so the level can be converted into the value based on M antenna branches, and is reported, and as a result, the number of mobile terminals to be accommodated by one base station can be appropriately increased while maintaining communication quality.

Embodiment 5

Now Embodiment 5 will be described. Embodiment 5 is an example when the presence or absence of the correction processing, in such an embodiment as Embodiment 2, is selected according to the receive environment of the receive antennas.

FIG. 6 shows a configuration example of a mobile terminal 10 according to Embodiment 5. The configuration of the first and second receive antennas 11-1 and 11-2 to the correction processing section 19 is the same as that of the mobile terminal 10 in Embodiment 2 (FIG. 2). The mobile terminal 10 of Embodiment 5 further has an interference level estimation section 23 and a switch (SW) 24.

The interference level estimation section 23 receives the Ec/NO input from the level measurement section 18, estimates the rate of interference in a cell of one base station, and outputs a logical signal to switch so that a result of correction processing is output to the SW 24 if interference is higher than a predetermined level. If interference is lower than the predetermined level, on the other hand, the interference level estimation section 23 outputs a logical signal so that the result of the correction processing is not output.

The SW 24 switches the switch based on the logical signal from the interference level estimation section 23, and outputs the correction processing result or the level measurement result without performing correction processing.

FIG. 7(A) and FIG. 7(B) are diagrams depicting the effect of Embodiment 5. As FIG. 7(A) shows, a circular communication possible area exists around a base station 100. In the case of this example, three mobile terminals, 10, 110 and 120, are accommodated in the communication possible area.

In the example in FIG. 7(A), where the number of mobile terminals in the cell is small, the noise level is low, therefore the Ec/NO value in the mobile terminal 10 can be a large value. In this case, the mobile terminal 10 performs level report without correcting the three types of level measurement results (RSSI, CPICH_RSCP, and CPICH_Ec/NO) (outputs the level measurement result from the SW 24 without performing correction processing).

In this example where the number of mobile terminals in the cell is small, the mobile terminal 10 reports a high level without correction, and as a result, the total interference received by the mobile terminals 110 and 120 is low, even if communication reaches the boundary of the communication possible area maintaining communication quality, so the number of mobile terminals which can be accommodated (that is, which can communicate) in the cell does not decrease.

On the other hand, if the number of mobile terminals 10, 110, . . . in the cell increases as shown in FIG. 7(B), the mobile terminals 10 receive interference from other mobile terminals 110, . . . so noise increases and the Ec/NO value decreases. In this case, correction processing is performed for the level measurement result (the SW 24 outputs the result of the correction processing), so that a converted value based on the "1" antenna branch is reported. By this, the mobile terminal 10 does communicate near the boundary which could cause a major interference with other mobile terminal s 110, . . . , and the number of communicable mobile terminals 110, 120 . . . in the cell can be appropriately maintained.

In Embodiment 5, the rate of interference from Ec/NO is estimated and correction processing is selectively performed depending on the estimation result, so the number of mobile terminals 10, 110, . . . in the cell can be appropriately increased (see FIG. 7(B)) while maintaining the communication quality (see FIG. 7(A)).

In the interference level estimation section 23, a threshold is set according to the environment of the cell, and is stored in a memory in the interference level estimation section 23, so that the height of the interference level is judged by a comparison of this threshold and Ec/NO.

In Embodiment 5, an example of the receive diversity function using the two receive antennas 11-1 to 11-2 was shown, but this embodiment can also be applied for the n number of receive antennas 11-1 to 11-*n*, just like Embodiment 3, and the same functional effect can be implemented.

The weighting may be performed for each receive antenna 11-1 to 11-*n*, just like Embodiment 4, whereby the same functional effect can be implemented.

Embodiment 6

Now Embodiment 6 will be described. In Embodiment 6, the presence or absence of the receive diversity function is selectively switched depending on the type of receive signal, and the presence or absence of the correction processing is also switched accordingly.

Figure 8:
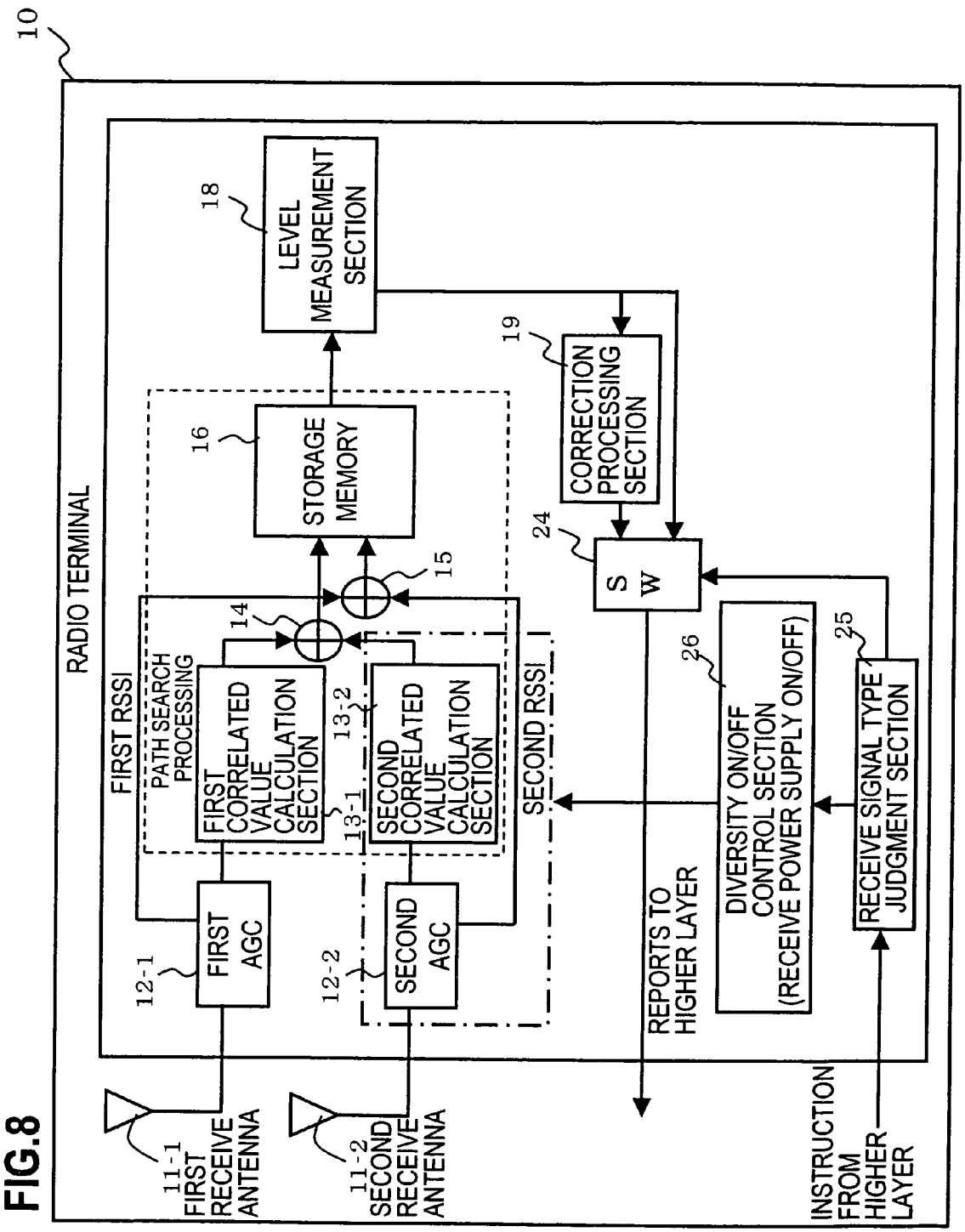
FIG. 8 is a diagram depicting another configuration example of the mobile terminal.

FIG. 8 shows a configuration example of a mobile terminal 10 according to Embodiment 6. Compared with the mobile terminal 10 in Embodiment 5 (FIG. 6), the interference level estimation section 23 does not exist, and a receive signal type judgment section 25 and a diversity ON/OFF control section 26 are added.

The receive signal type judgment section 25 receives an instruction from the higher layer. This instruction includes information to indicate a type on whether the mobile terminal 10 is in "standby" or "talking". The receive signal type judgment section 25 outputs logical signal "standby" or "talking" based on this instruction.

If a logical signal to indicate "standby" is input, the diversity ON/OFF control section 26 turns the power of the antenna branch connected to the second receive antenna 11-2 OFF, so as to turn the diversity function OFF.

If a logical signal to indicate "talking" is input, on the other hand, the diversity ON/OFF control section 26 turns the power of the antenna branch connected to the second receive antenna 11-2 ON, so as to turn the diversity function ON.

If a logical signal indicates "standby", the SW 24 outputs a logical measurement result (RSSI, CPICH_RSCP and CPICH_Ec/NO) without performing correction. If a logical signal indicates "talking", on the other hand, the SW 24 outputs a level measurement result after performing correction.

If the mobile terminal 10 is in "standby", the receive diversity function is OFF, so only the first receive antenna 11-1 is used for reception, and the level measurement result for the "1" antenna branch is reported without performing correction processing. Therefore the original communication quality can be maintained in an area where the mobile terminal 10 can perform standby communication. Since the receive diversity function is OFF, power consumption of the mobile terminal 10 is low.

When the mobile terminal 10 is in "talking" (after talking started), the receive diversity function is turned ON, and the level measurement result after correction processing, that is, the level measurement result converted into a value based on the "1" antenna branch, is reported. Since the receive diversity function is ON, the communication quality can be maintained even if the mobile terminal 10 is positioned at a boundary of the communication possible area. Also the level result after correction processing is reported, so the number of mobile terminals can be appropriately increased while maintaining the communication quality, just like Embodiment 2.

Therefore the receive diversity is applied only when high quality communication is required (in the case of "talking"), otherwise the receive diversity is turned OFF (in the case of "standby"), so unnecessary power consumption is prevented. Regardless whether the receive diversity function is ON or OFF, an appropriate value is reported for the level measurement result, so the number of mobile terminals can be appropriately increased while maintaining the communication quality.

In Embodiment 6 as well, an antenna may be comprised of n number of receive antennas 11-1 to 11-*n*, just like Embodiment 3, or weighting may be performed considering a gain difference, just like Embodiment 4. In either case, a functional effect similar to Embodiment 6 can be implemented.

Embodiment 7

Now Embodiment 7 will be described. In Embodiment 7, the presence or absence of the receive diversity function is selectively switched depending on the frequency band of a receive signal, and the presence or absence of the correction processing is also switched accordingly.

Generally, even if the moving speeds of mobile terminals are the same, a velocity change at which a radio wave is switched becomes fast, and a fading frequency becomes high, because the wavelength becomes short if the receive frequency band is high. Therefore an improved effect can be increased by turning the receive diversity function ON when the receive frequency band is high. Also power consumption of the mobile terminal can be suppressed by turning the receive diversity function OFF when the receive frequency band is low.

Figure 9:
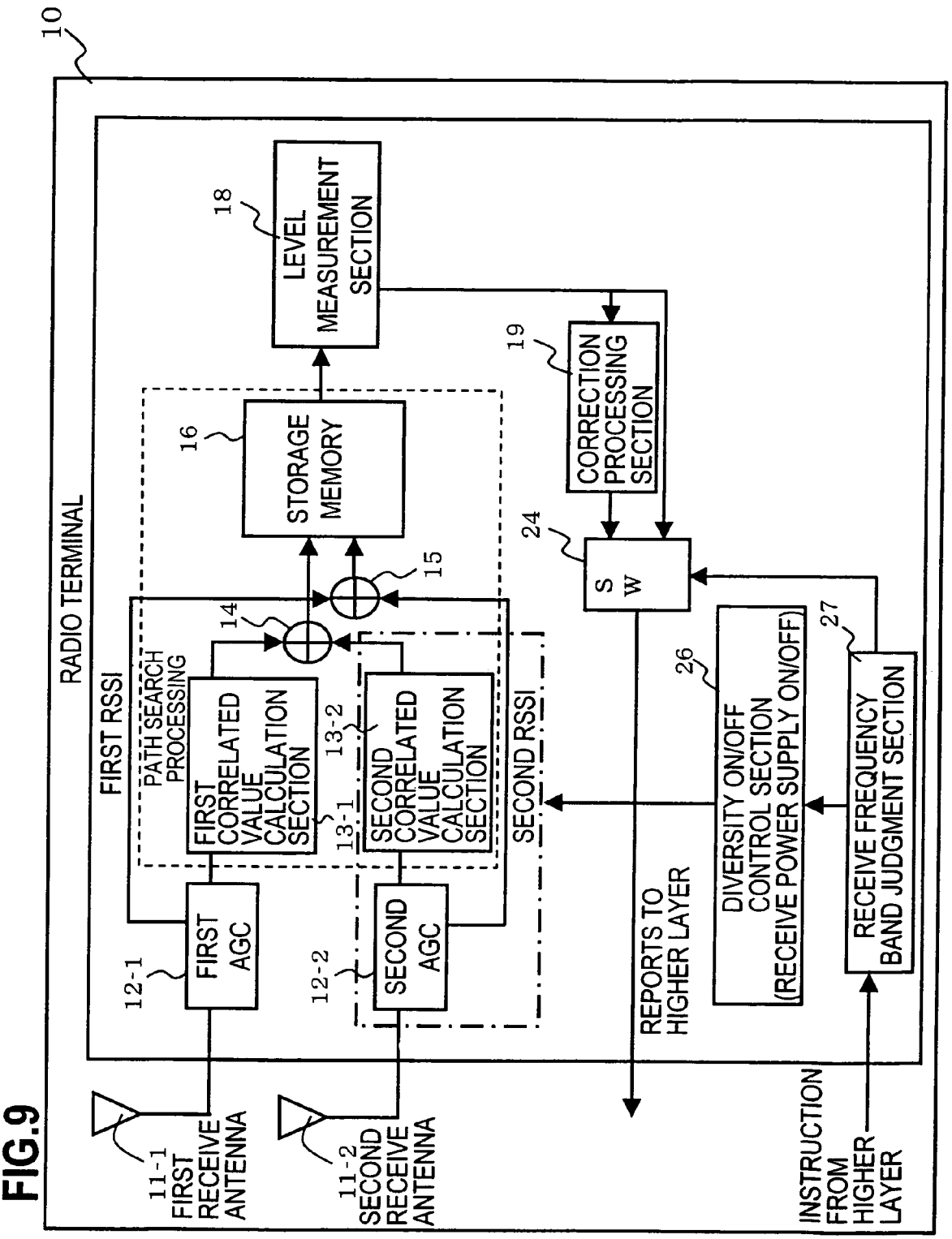
FIG. 9 is a diagram depicting another configuration example of the mobile terminal.

FIG. 9 shows a configuration example of a mobile terminal 10 according to Embodiment 7. The receive signal type judgment section 25 of the mobile terminal 10 in Embodiment 6 (FIG. 8) is replaced with a receive frequency band judgment section 27, and the rest of the configuration is the same as Embodiment 6.

The receive frequency band judgment section 27 receives an input of information to indicate the receive frequency band of the receive signal as an instruction from a higher layer, and judges the level of the receive frequency band. The receive frequency band judgment section 27 outputs a logical signal according to the judgment.

The diversity ON/OFF control section 26 turns the power of the antenna branch connected to the second receive antenna 11-2 ON, so as to turn the receive diversity function ON, if a logical signal to indicate that the receive frequency band is high is input.

On the other hand, the diversity ON/OFF control section 26 turns the power of the antenna branch connected to the second receive antenna 11-2 OFF, so as to turn the receive diversity function OFF, if a logical signal to indicate that the receive frequency band is low is input.

The SW 24 outputs the level measurement result (RSSI, CPICH_RSCP and CPICH_Ec/NO) after correction processing is performed, if a logical signal to indicate that the receive frequency band is high is input.

On the other hand, the SW 24 outputs the level measurement result without performing correction, if a logical signal to indicate that the receive frequency band is low is input. When the receive frequency band is low, the receive diversity function is OFF, so the level measurement result is a result based on the "1" antenna branch.

Figure 10:
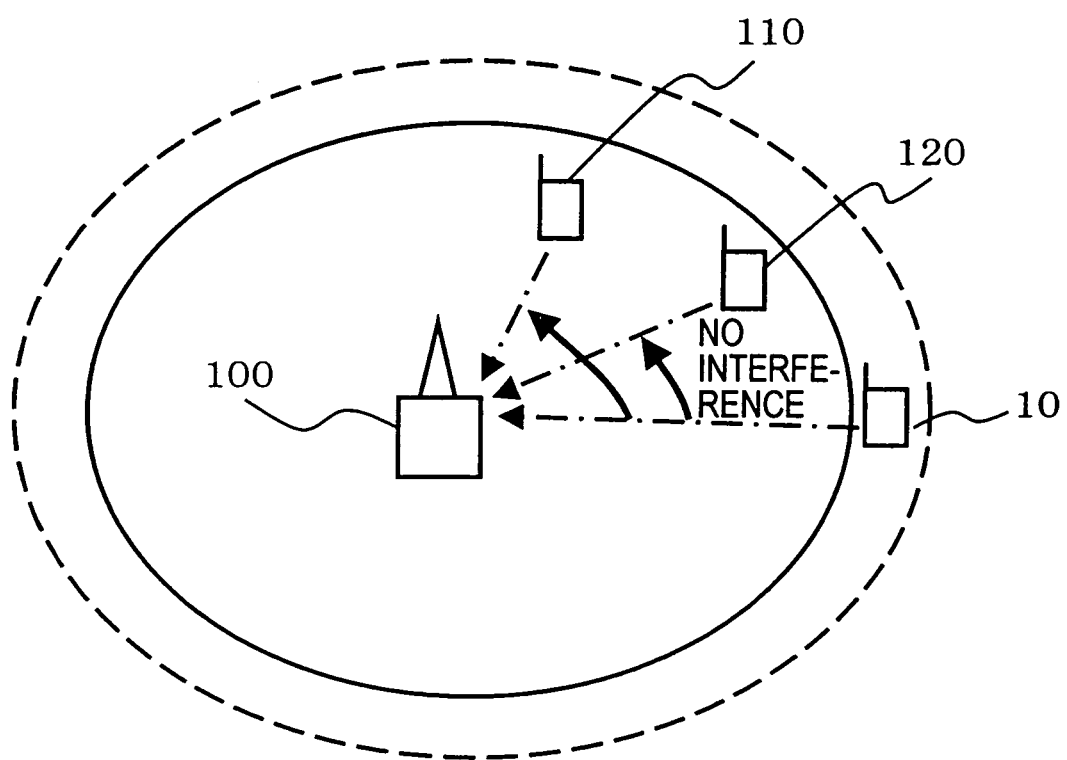
FIG. 10 is a diagram depicting the effect of Embodiment 7.

FIG. 10 is a diagram depicting the effect of Embodiment 7. When the mobile terminal 10 communicates while moving using a high receive frequency, the mobile terminal 10 is in an area where communication becomes impossible (outside the solid line in FIG. 10), unless the receive diversity function is applied, and when the mobile terminal 10 communicates while moving using a low frequency, the mobile terminal 10 is in an area where communication is possible even if the receive diversity function is not applied (inside the dotted line in FIG. 10). Since the receive diversity function is ON when the receive frequency band of the mobile terminal 10 is high, communication can be continued with maintaining communication quality even if the solid line in FIG. 10 is passed. At this time, the mobile terminal 10 reports the corrected level measurement result to the base station 100 as the level report value (level measurement converted into a value based on the "1" antenna branch is reported), therefore the mobile terminal 10 does not communicate beyond the boundary (dotted line in FIG. 10) when communication is performed using a low frequency, and the generation of interference with other mobile terminals 110 and 120, which could occur in this case, can be decreased, and the number of mobile terminals can be appropriately increased while maintaining the communication quality, just like Embodiment 2.

When the receive frequency band is low, on the other hand, the receive diversity function is OFF, so receiving is only via the first receive antenna 11-1, and the level measurement result for the "1" antenna branch is reported even if correction processing is not performed. Therefore the mobile terminal 10 does not communicate beyond the boundary (dotted line in FIG. 10) when communication is performed using a low frequency, and interference with other mobile terminals existing in a same cell, which could occur in this case, decreases, and communication quality of these mobile terminals can be maintained at a predetermined level. Also the receive diversity function is turned OFF, so power consumption of the mobile terminal 10 is low.

Therefore just like Embodiment 6, the receive diversity is applied only when high quality communication is required (in the case of a high receive frequency band), otherwise receive diversity is turned OFF (in the case of a low receive frequency band), so unnecessary power consumption is prevented. Regardless whether the receive diversity function is ON or OFF, an appropriate value is reported for the level measurement result, so the number of mobile terminals can be appropriately increased while maintaining the communication quality.

Figure 11:
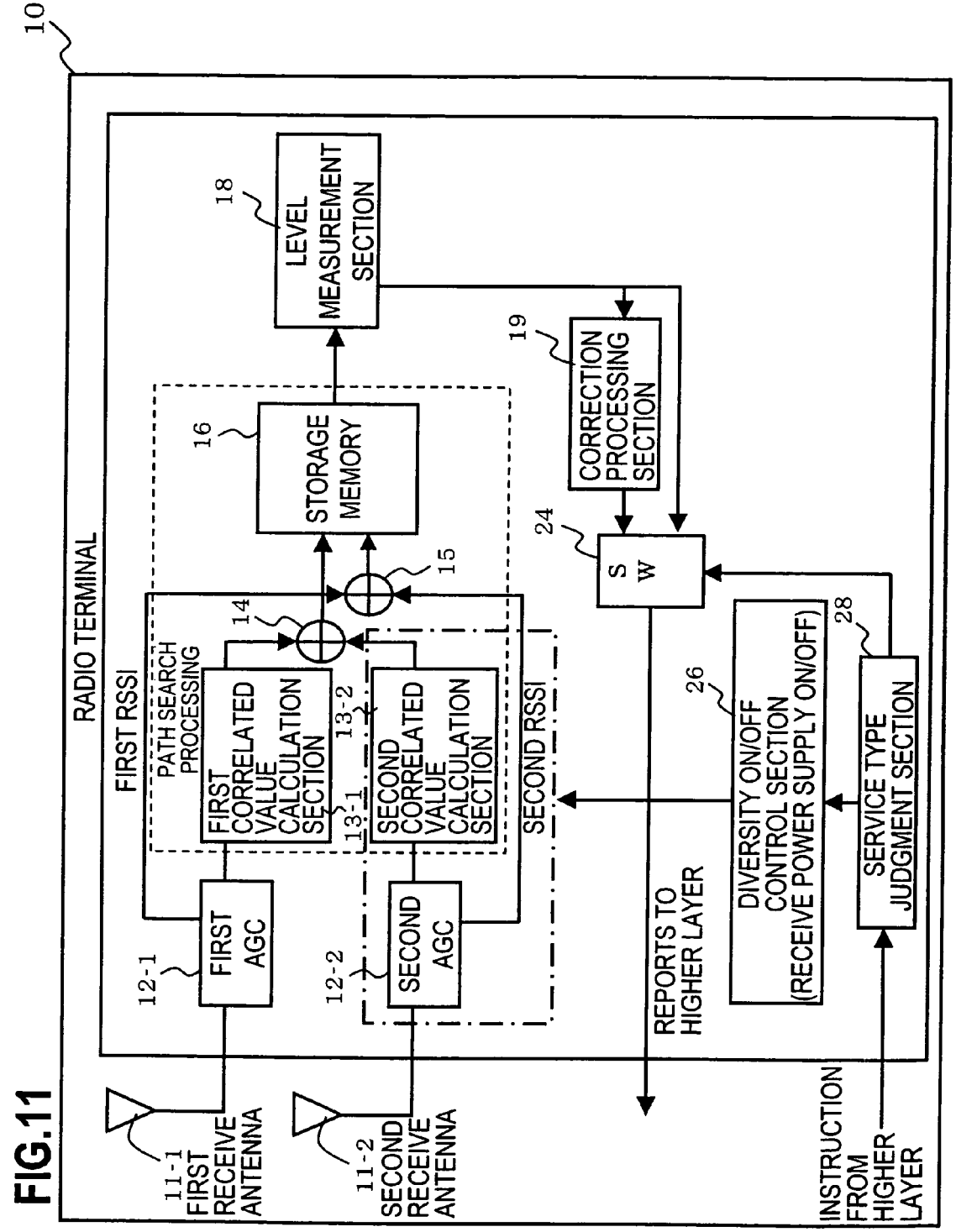
FIG. 11 is a diagram depicting another configuration example of the mobile terminal.

FIG. 11 shows a configuration example of another mobile terminal 10 according to Embodiment 7. Instead of the frequency band judgment section 27, a service type judgment section 28 is provided.

The service type judgment section 28 judges the type of communication service (communication service via images or communication service via voice) based on an instruction from a higher layer, and outputs a logical signal according to this type.

If the communication service is a "voice communication", the diversity ON/OFF control section 26 turns the diversity function OFF, and the SW 24 reports the level measurement result, without performing correction processing, to the higher layer. If the communication service is an "image communication", on the other hand, the diversity ON/OFF control section 26 turns the diversity function ON, and the SW 24 reports the level measurement result, after correction processing is performed, to the higher layer.

Image communication demands a higher communication quality than voice communication. Therefore in the case of image communication, the receive diversity function is turned ON to secure communication quality, while in the case of voice communication, the receive diversity function is turned OFF to suppress power consumption.

Just like the above examples, an appropriate value is reported for the level measurement result, regardless whether the receive diversity function is ON or OFF, so the communication quality and the number of accommodated mobile terminals in an entire system can be maintained appropriately.

The instruction from the higher level may be an instruction from a user instead. For example, the present embodiment can be implemented even if the user performs processing based on the received instruction, such as "image is communicated from now" or "communication is performed via voice", and a similar functional effect can be implemented.

In either example of Embodiment 7, the antenna may be comprised of n number of receive antennas 11-1 to 11-*n*, just like Embodiment 3, or weighting may be performed considering a gain difference, just like Embodiment 4. In either case, a function effect similar to Embodiment 7 can be implemented.

Embodiment 8

Now Embodiment 8 will be described. In Embodiment 8, when the presence or absence of the correction processing according to Embodiment 2, ON or OFF of the diversity function according to Embodiment 6, and a weight coefficient (e.g. Gain 1 in Embodiment 4) and correction coefficient (e.g. 1.8 dB in Embodiments 2 and 3) if the correction are performed are explicitly reported to a higher layer.

Figure 12:
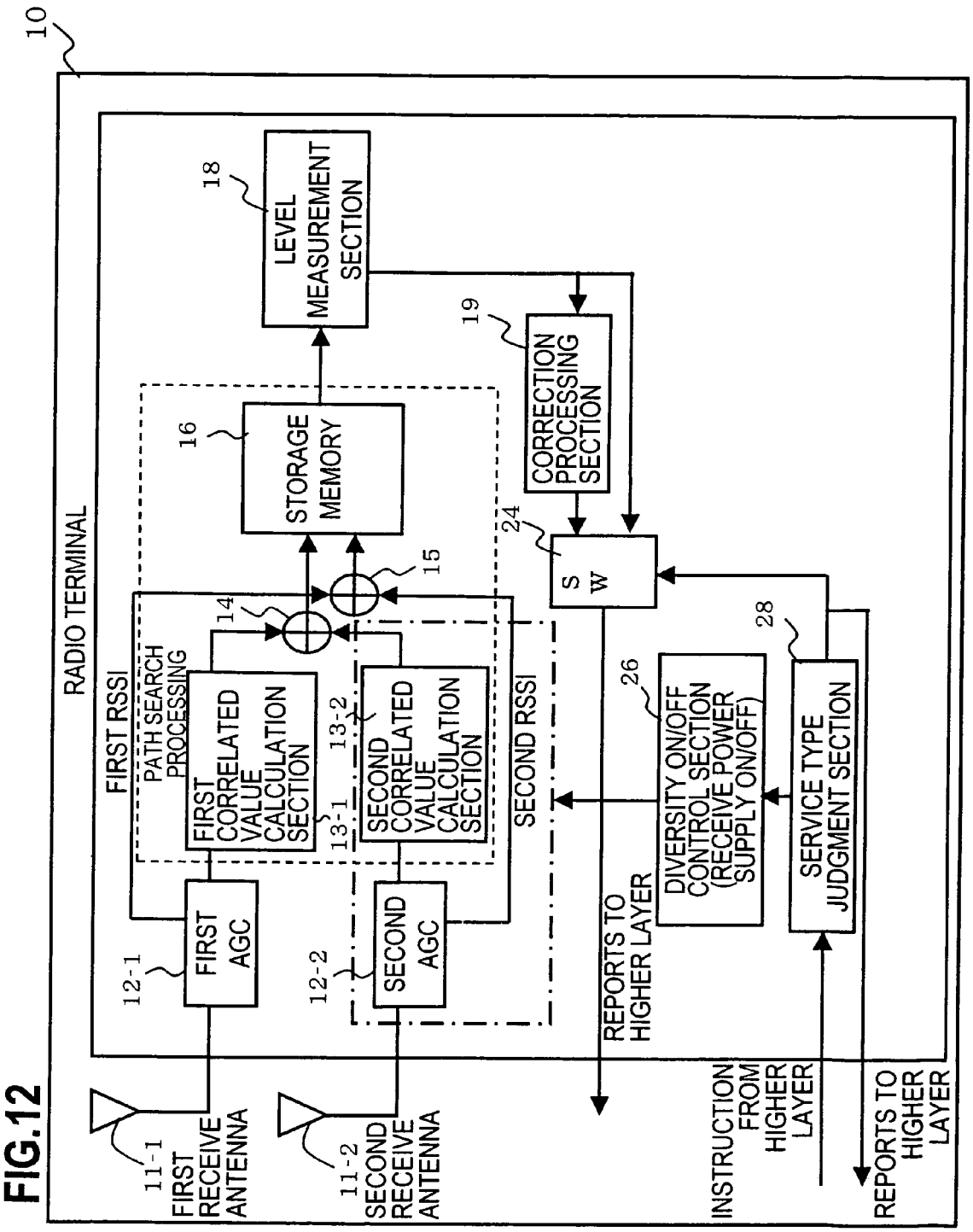
FIG. 12 is a diagram depicting another configuration example of the mobile terminal.

FIG. 12 shows a configuration example of a mobile terminal 10 according to Embodiment 8. The general configuration is roughly the same as Embodiment 7 (FIG. 11). The service type judgment section 28 outputs a logical signal according to the service type to the diversity ON/OFF control section 26, where a service type for performing receive diversity and a service type for reporting the correction processing result can be known in advance.

Therefore the service type judgment section 28 judges the service type based on an instruction from the higher layer, and reports the ON or OFF of the receive diversity function and the presence or absence of the correction processing. If the correction coefficient is also stored in memory in advance in the case of performing correction, this value can also be reported to the higher layer.

Embodiment 8 can not only implement a functional effect similar to Embodiment 7, but can also explicitly report the presence or absence of the correction of the level measurement result, the ON or OFF of the diversity function and correction coefficient to the higher layer (and base station), so communication quality of the entire system can be maintained and the number of accommodated units can be appropriately increased even at the higher level.

In the example shown in FIG. 12 as well, n numbers of receive antennas 11-1 to 11-n may be provided, just like Embodiment 4 (FIG. 5), and the weight coefficient can be multiplied, or the coefficient may be stored in memory and reported to the higher layer via the service type judgment section 28. By reporting the weight coefficient, along with the presence or absence of the correction, communication quality can be further assured, and the number of accommodated units can be increased even more appropriately.

In the example shown in FIG. 12, the mobile terminal 10 has the service type judgment section 28, but the mobile terminal 10 may have the receive signal type judgment section 25 or the receive frequency band judgment section 27, instead of the service type judgment section 28, whereby a same functional effect can be implemented.

Embodiment 9

Now Embodiment 9 will be described. In Embodiment 9, the condition to judge "inside area" and "outside area" of a mobile terminal is switched by selecting the ON or OFF of the receive diversity function.

Figure 13:
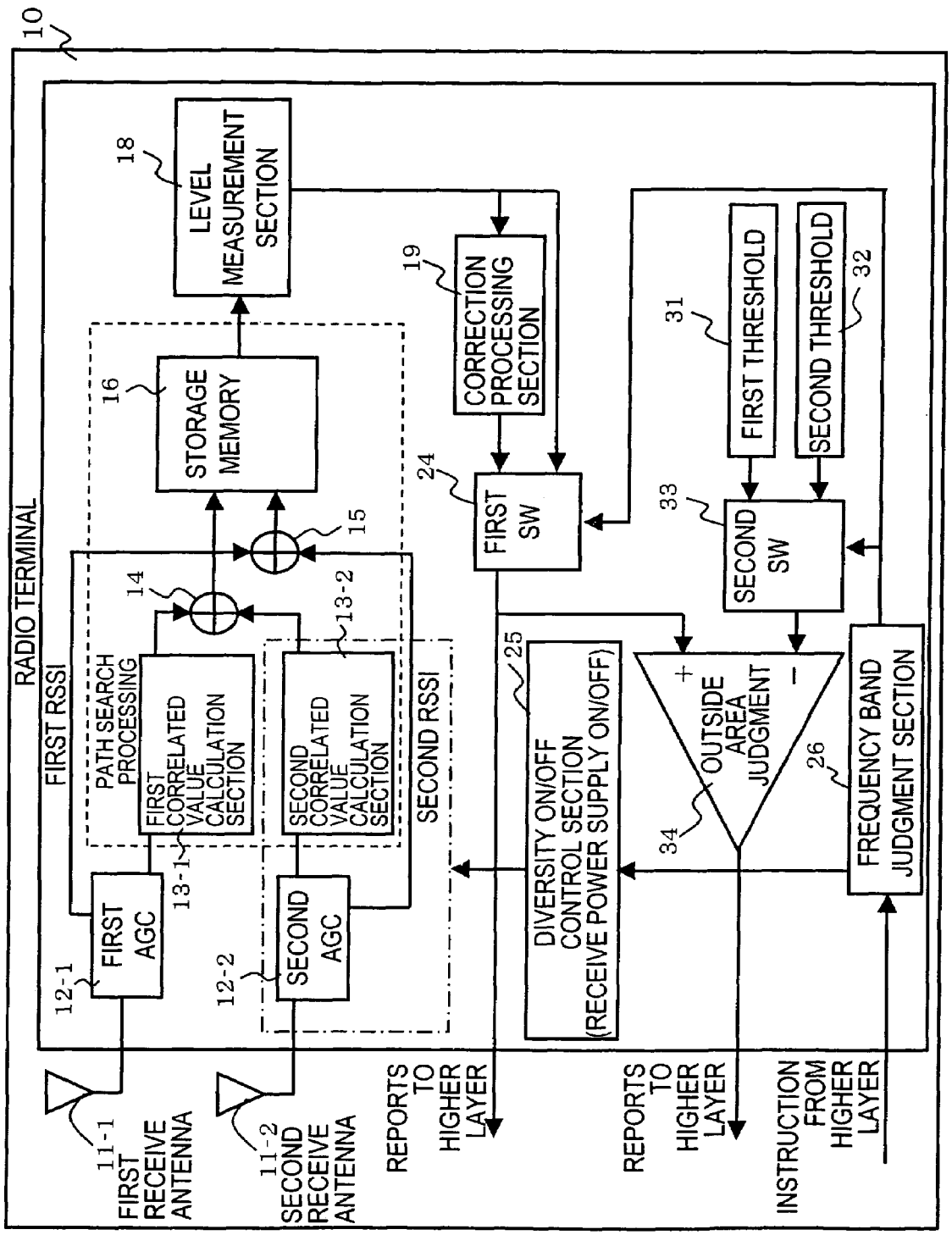
FIG. 13 is a diagram depicting another configuration example of the mobile terminal.

FIG. 13 shows a configuration example of a mobile terminal 10 according to Embodiment 9. The mobile terminal 10 further has a first storage section 31 for storing a first threshold, a second storage section 32 for storing a second threshold, a second SW 33, and an outside area judgment section 34, in comparison with the mobile terminal 10 of Embodiment 7 (FIG. 9). Since the second SW 33 is added, the SW 24 is called a first SW 24.

When the frequency band judgment section 27 judges that the receive frequency is high, the diversity ON/OFF control section 26 turns the power of the antenna branch connected to the second receive antenna 11-2 ON, so as to turn the receive diversity function ON. At this time, the first SW 24 outputs the level measurement result, which is output from the correction processing section 19.

In this case, the mobile terminal 10 reports the corrected level, which is a value lower than an actual value. In order for the mobile terminal 10 to position in the "inside area" even if a low value is reported like this, the second SW 33 is switched so as to select a lower threshold out of the two thresholds (select the first threshold if first threshold<second threshold). Then the outside area judgment section 34 performs outside area judgment using this selected first threshold.

If the frequency band judgment section 27 judges that the receive frequency band is low, on the other hand, the receive diversity function is turned OFF and an uncorrected level measurement result is output. In this case, the original level measurement result, when the receive diversity function is OFF, is reported as the level measurement result, so the second SW 33 selects the original threshold (second threshold), and the outside area judgment section 34 performs outside area judgment.

Figure 14:
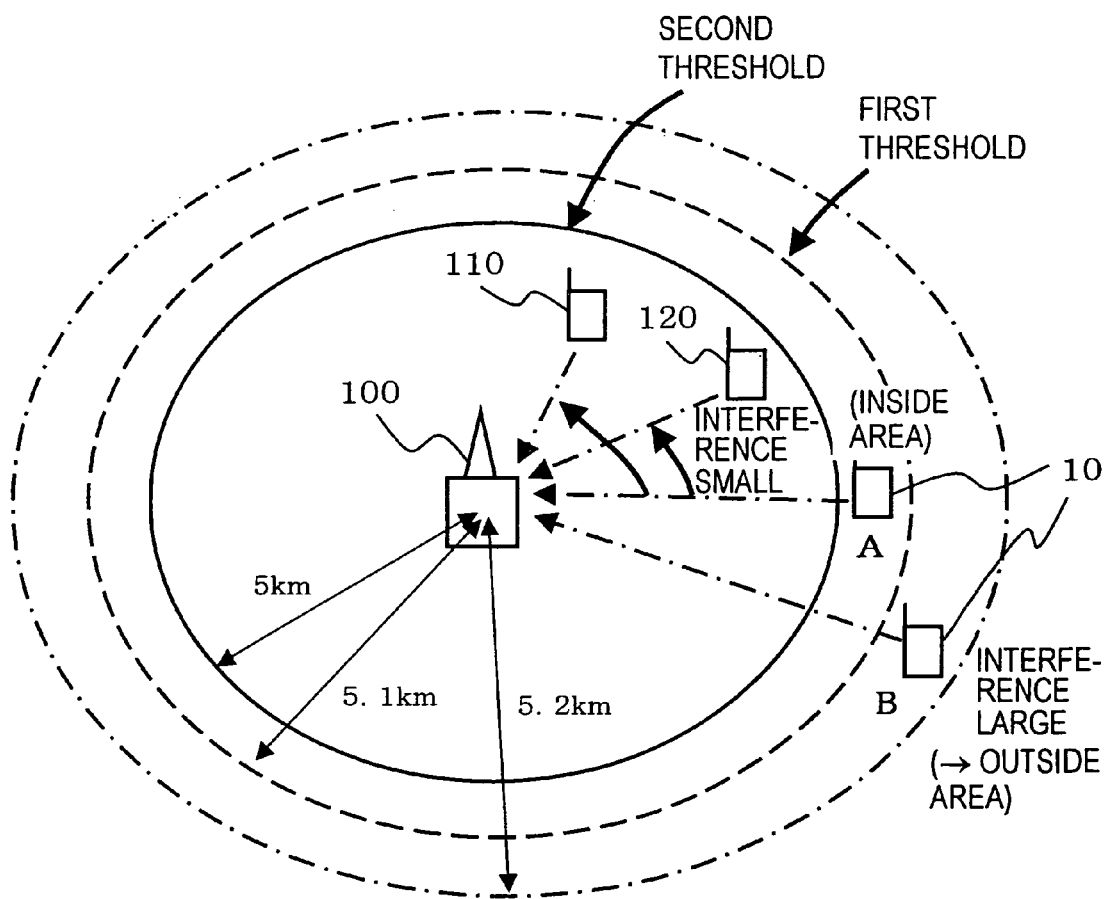
FIG. 14(A) is an example of a threshold to be selected.
FIG. 14(B) is a diagram depicting the concept of the first and second thresholds.

FIG. 14(A) shows an example of the thresholds to be selected. When the receive diversity function is ON (when the receive frequency band is high), the first SW 24 selects the output of presence of the correction, and the second SW 33 selects the first threshold. When the receive diversity is OFF (when the receive frequency band is low), on the other hand, the first SW 24 selects the output of absence of the correction, and the second SW 33 selects the second threshold.

FIG. 14(B) is a diagram depicting the concept of the first threshold and the second threshold. When the mobile terminal 10 turns the receive diversity function ON and is at position A, sufficient receive radio waves can be sent to and receive from the base station 100 by turning the receive diversity function ON. In this case, the first threshold is selected so as to be judged as "inside area". Since the mobile terminal 10 reports the level measurement result after correction, little interference is generated with other mobile terminals 110 and 120.

When the mobile terminal 10 moves to position B, and the receive diversity function remains ON, however, the transmission and reception radio waves increase, and interference with other mobile terminals 110 and 120 increases. Therefore in such a case, the judgment result should becomes "outside area".

The first threshold indicates a boundary of the communication area where interference is not generated with other mobile terminals 10 (interference with other mobile terminals 110 and 120 is in a tolerable range) when the receive diversity function is turned ON.

The second threshold, on the other hand, indicates a boundary of the original area where communication is possible. The mobile terminal 10 is judged as in an "inside area" if it is in the area indicated by the solid line when the receive diversity function is turned OFF, and is judged as in the "outside area" if it moves into position A.

Since the reference of the level of the receive signal at which the "outside area" is judged is controlled according to the frequency band (that is the presence or absence of the receive diversity), "inside area" or "outside area" can be judged appropriately. The rest of the configuration is the same as Embodiment 7, so just like Embodiment 7, the number of accommodated units can be increased appropriately while maintaining communication quality.

In Embodiment 9, the threshold, which is a condition to judge "inside area" or "outside area", is switched by the ON or OFF of the receive diversity function, but a condition for activating handover (operation to switch a communication target base station) may be switched by the ON or OFF of the receive diversity function. For example, this can be implemented by replacing the judgment of "outside area" with the judgment of "handover switching". In this case, handover can be switched appropriately.

Also a threshold, which is a condition to report the generation of a factor to activate handover (condition to report of the mobile terminal 10 approaching the boundary of a communication possible area), may be switched by the ON or OFF of the receive diversity function. A condition to request activation of handover (condition for the mobile terminal 10 to request switching by handover) may be switched. For the first and second thresholds, appropriate values according to these conditions can be stored in each storage section 31 and 32, thereby the same functional effect can be implemented.

In the configuration of the mobile terminal 10, the receive signal type judgment section 25 (FIG. 8) or the service type judgment section 28 (FIG. 11) may be provided instead of the frequency band judgment section 27. In this case as well, a functional effect just like Embodiment 9 can be implemented.

The mobile terminal 10 may have n number of receive antennas 11-1 to 11-n, just like Embodiment 3 and Embodiment 4, or weighting may be performed for the outputs thereof.

Embodiment 10

Now Embodiment 10 will be described. Embodiment 10 is an example when "outside area" or "inside area" judgment in Embodiment 9 is performed at the base station side. Actual judgment, however, is the same as the judgment of "handover switching" or "termination condition (forced disconnection of communication due to drop in level)".

Figure 15:
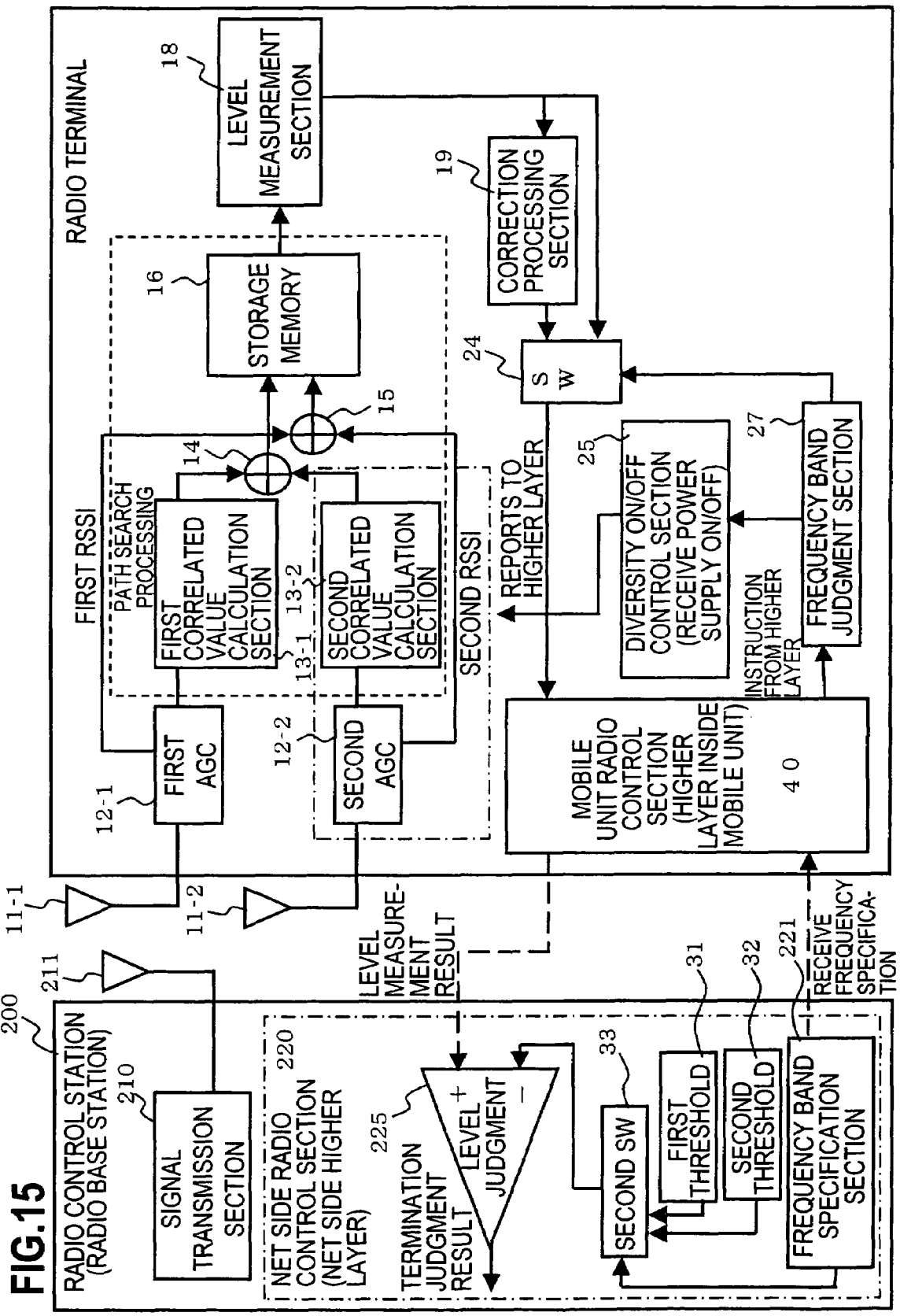
FIG. 15 is a diagram depicting a configuration example of the entire system.

FIG. 15 shows a configuration example of an entire system according to Embodiment 10. The mobile terminal 10 further has mobile terminal radio control section (higher layer in mobile terminal) 40 for receiving and transmitting information to and from the base station, in comparison with the configuration in FIG. 9 (Embodiment 7).

The base station (radio control station or radio base station, hereafter called "base station") 200 has a signal transmission section 210, a transmission antenna 211, and a net side radio control section 220 (net side higher layer).

The net side radio control section 220 has a frequency band specification section 221 for specifying a frequency band to the mobile terminal 10, first and second storage sections 31 and 32 for storing first and second thresholds, a second SW 33, and a level judgment section 225.

The frequency band specification section 221 specifies the receive frequency band to the mobile terminal 10, and outputs a specification signal. An actual specification signal is transmitted to the mobile terminal 10 via a radio line, but is shown by the dotted line in FIG. 15.

This specification signal is output to the frequency judgment section 27 via the mobile terminal radio control section 40. The frequency band judgment section 27 judges the level of the specified frequency band, just like Embodiment 7.

When the receive frequency is high, the mobile terminal 10 turns the power of the receive diversity branch ON, and outputs the level measurement result as a value corrected to a value based on the "1" antenna. When the receive frequency band is low, on the other hand, the mobile terminal 10 turns the power of the receive diversity branch OFF, and outputs the level measurement result without performing correction.

The level measurement result is output to the net side radio control section 220 via the mobile terminal radio control section 40, and is used for judgment in the level judgment section 225. This measurement result is also output to the base station 200 via the radio line, which is indicated by the doted line.

A receive frequency specified by the frequency band specification section 221 is output to the second SW 33, and the second SW 33 selects and outputs the first threshold or second threshold depending on the level of this frequency band. In this case, just like Embodiment 9, the second SW 33 selects the first threshold (<second threshold) when the receive frequency band is high (when the receive diversity function of the mobile terminal 10 is ON), and selects the second threshold, which is an original, when the receive frequency band is low (when the receive diversity function is OFF).

When the receive diversity function is ON, the level management result, which is lower than the original result, is output from the mobile terminal 10, so a threshold to be a condition of handover or termination is set to be a lower one (first threshold), and judgment is performed. When the receive diversity function is OFF, on the other hand, an original level measurement result of the "1" antenna is output, so an original threshold (second threshold) is selected, and judgment is performed.

In the base station, the frequency band specification section 221 controls the second SW 33 and changes the threshold which is a reference of a condition of handover or termination, according to the frequency band (ON or OFF of receive diversity function of the mobile terminal 10, and presence or absence of the correction processing), so the base station 200 can judge whether "handover" or "termination" is activated appropriately. The rest is the same as Embodiment 7, so the effect of Embodiment 7, that is "the number of accommodated units can be appropriately increased while maintaining the communication quality" can also be implemented by Embodiment 10.

In the configuration of the mobile terminal 10 as well, the antenna may be comprised of n number of receive antennas 11-1 to 11-n, just like Embodiment 3 or Embodiment 4, or weighting may be performed for the outputs, whereby the same functional effect can be implemented.

Embodiment 11

Now Embodiment 11 will be described. In Embodiment 11, the base station 200 side judges "handover" or "termination", just like Embodiment 10, but the mobile terminal 10 side reports a measurement mode based on which judgment is performed. This is because the specified receive frequency band may not be correlated to ON or OFF of the receive diversity function of the mobile terminal 10.

Figure 16:
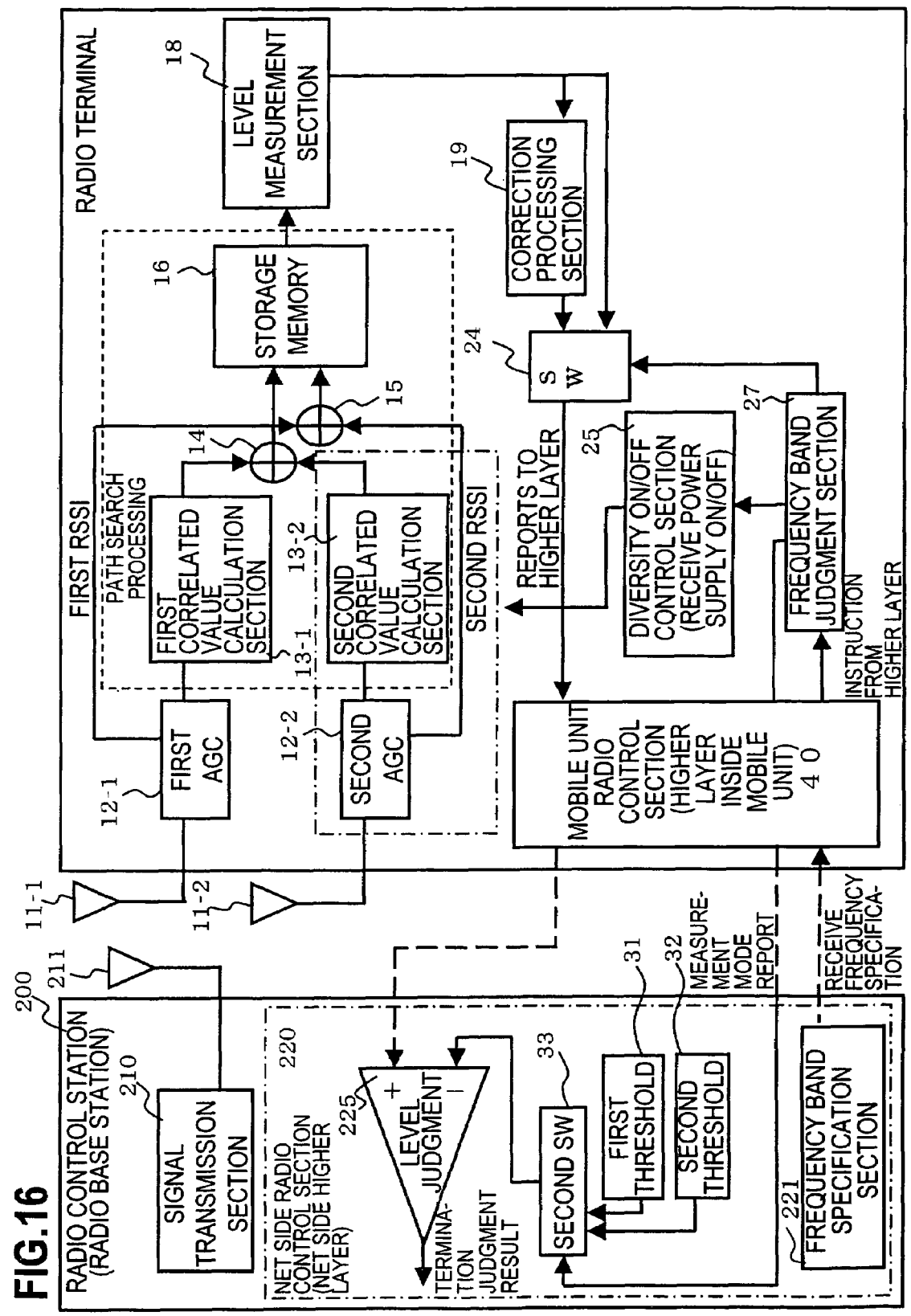
FIG. 16 is a diagram depicting another configuration example of the entire system.

FIG. 16 shows a configuration example of an entire system according to Embodiment 11. This is similar to FIG. 15 (Embodiment 10), but the second SW 33 switches a threshold to be selected according to the measurement mode (ON or OFF of receive diversity function, or presence or absence of the correction processing) from the frequency band judgment section 27 of the mobile terminal 10, not according to information from the frequency band specification section 221.

For example, when the frequency band judgment section 27 reports information on the presence or absence of the correction as the measurement mode, the following processing is performed. In the case of a correction presence (receive diversity function is ON), the second SW 33 selects a first threshold (in this example as well, it is assumed that first threshold<second threshold), which is used for level judgment in the level judgment section 225. In the case of correction absence (receive diversity function is OFF), on the other hand, the second SW 33 selects the second threshold.

With the exception that the second SW 33 performs judgment based on the measurement mode from the mobile terminal 10, Embodiment 11 is the same as Embodiment 10. Therefore Embodiment 11 allows the base stations to appropriately judge whether the processing of "handover" or "termination" is activated or not, just like Embodiment 10, and the number of accommodated units can be appropriately increased while maintaining communication quality.

In Embodiment 11 as well, the antenna may be comprised of n number of receive antennas 11-1 to 11-n, or weighting may be performed for the outputs, whereby the same functional effect can be implemented.

Embodiment 12

Now Embodiment 12 will be described. Embodiment 12 is an example when the increase and decrease of a transmission signal level is switched according to the service type (that is, according to the ON or OFF of receive diversity function) in the mobile terminal 10 having a close loop transmission power control function for controlling the increase and decrease of power when a signal is transmitted from the base station.

Figure 17:
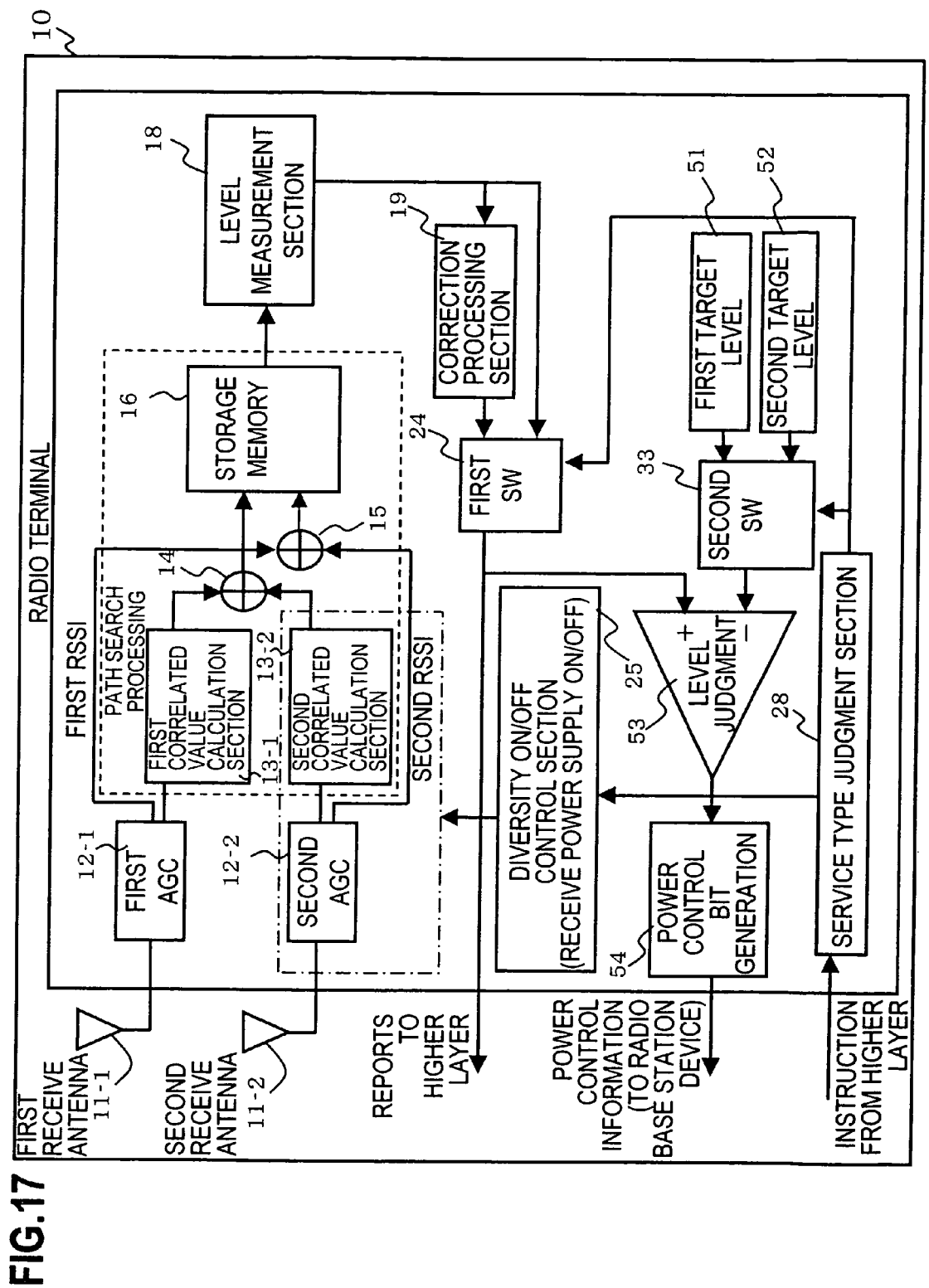
FIG. 17 is a diagram depicting another configuration example of the mobile terminal.

FIG. 17 shows a configuration example of a mobile terminal 10 according to Embodiment 12. First and second target levels are stored in a third and fourth sections 51 and 52, a level judgment section 53 judges the level of the receive signal, a power control bit generation section 54 generates a bit to increase the transmission power if the level of the receive signal is low, and generates a bit to decrease the transmission power if the level of the receive signal is high. This bit is sent to the base station as power control information.

If the service type judgment section 28 judges that the service is voice communication, the diversity ON/OFF control section 26 switches the receive diversity function from ON to OFF. At this time, the receive sensitivity of the mobile terminal 10 worsens since the receive diversity function is turned OFF. Therefore the communication quality can be assured by requesting the base station side to increase the receive level.

In this case, the second SW 33 selects the first target level, which is a high target level, and outputs it to the level judgment section 53. In the level judgment section 53, the first target level and the level measurement result for the "1" antenna (uncorrected level measurement result is acquired since the receive diversity function is OFF) are compared, and the judgment result is output so that the receive level, which is higher for the amount of difference of the receive level between the ON and OFF of the receive diversity function, can be acquired. The power control bit generation section 54 generates a bit based on this judgment result, and sends it to the base station. The base station controls so as to increase the downstream transmission level to the mobile terminal 10 based on this power control information.

If the service type judgment section 28 judges that the service is an image communication, on the other hand, the receive diversity functions is switched from OFF to ON. At this time, the mobile terminal 10 does not really need the receive level up to this time, since the receive diversity functions is ON. Therefore the mobile terminal 10 requests the base station to drop the receive level down to a value sufficient enough to operate the receive diversity function.

In this case, the second SW 33 selects the second target level, which is a lower target level, and outputs it to the level judgment section 53. The level judgment section 53 compares the second target level and the level measurement result after correction (level measurement result after correction is acquired because the receive diversity function is ON), and outputs the judgment result so that a receive level, which can drop the receive level to a value sufficient enough to operate the receive diversity function, is acquired. The power control bit generation section 54 sends the power control information to the base station based on this judgment result, and the base station decrease the downstream transmission level to a transmission level sufficient enough to operate the receive diversity function for the mobile terminal 10.

Since the target transmission level of the closed loop transmission power control function is requested to the base station depending on the type of communication service (depending on the ON or OFF of the receive diversity function), the base station side can perform power control for the mobile terminal 10 appropriately in Embodiment 12.

The rest of the configuration is the same as Embodiment 7 in FIG. 11, so in Embodiment 12 as well, the number of accommodated units can be appropriately increased while maintaining the communication quality.

In Embodiment 12, the service type judgment section 28 judges the service type, but the same functional effect can be implemented even if judgment of the signal type of the receive signal (receive signal type judgment section 25) or judgment of the receive frequency band (receive frequency band judgment section 27) is used. The number of receive antennas may be n, and weighting may be performed for each output.

Embodiment 13

Now Embodiment 13 will be described. In Embodiment 12, the transmission target level is set by the service type, but in Embodiment 13, this request (power control information request) is sent to the base station in advance, before the ON or OFF of the receive diversity function is switched, so that the ON or OFF of the receive diversity function is switched after the receive signal reaches the target level.

Figure 18:
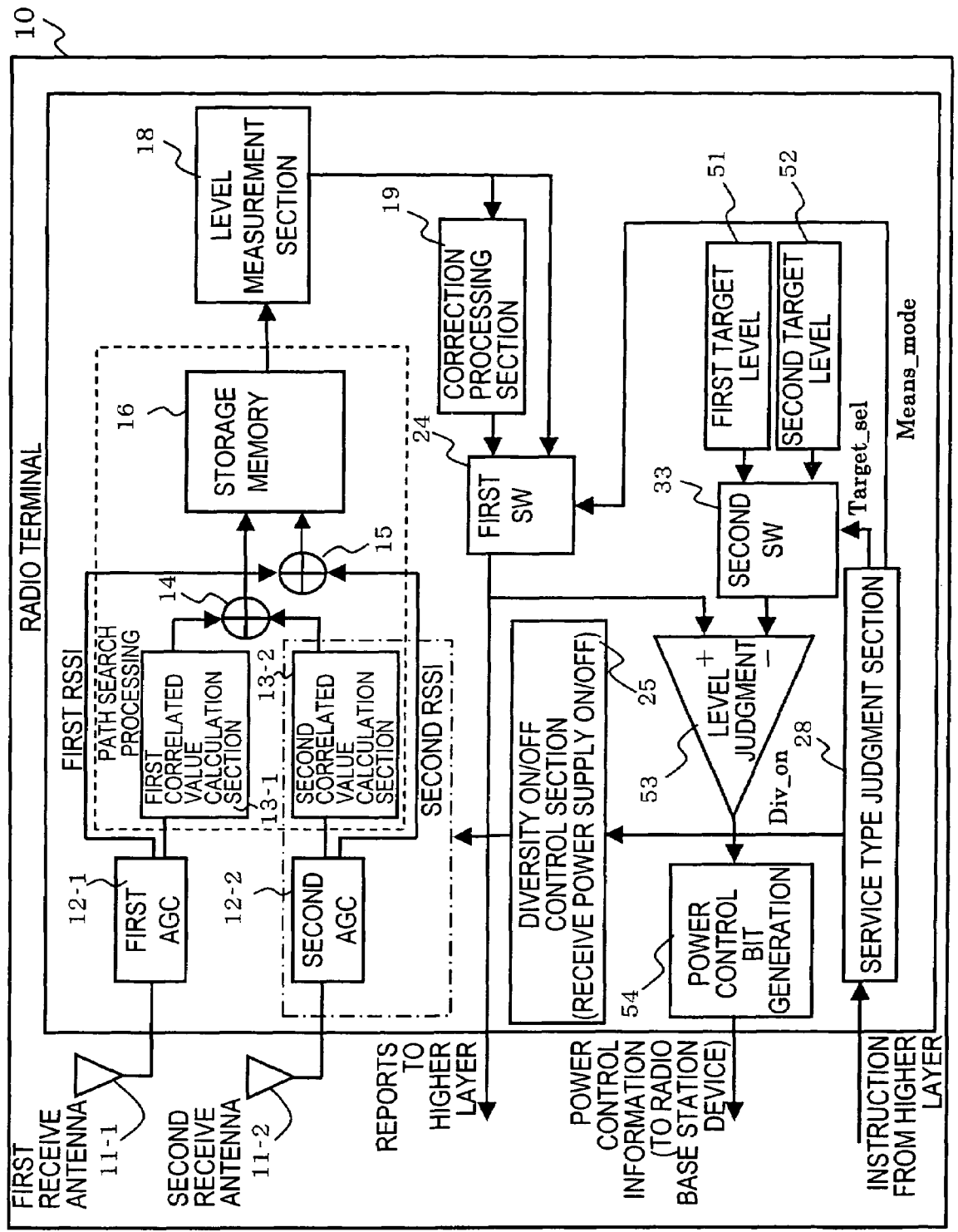
FIG. 18 is a diagram depicting another configuration example of the mobile terminal.

FIG. 18 shows a configuration example of a mobile terminal 10 according to Embodiment 13. FIG. 18 is roughly the same as FIG. 17, but Target_sel, which is a signal for switching to the second SW 33, is output from the service type judgment section 28, and Div_on, which is a signal for switching the ON or OFF of the diversity function, and Means_mode for switching the presence or absence of the correction processing, are output delayed by a predetermined delay time.

FIG. 19 is a diagram depicting the switching timing. For example, if "image communication" is now being performed and the higher layer instructs to switch to "voice communication" (indicated by a down arrow mark in FIG. 19), the receive diversity function is turned OFF. Therefore Target_sel to request to increase the target transmission level is output to the second SW 33, so that a higher target level (first target level, "target SIR 1" in FIG. 19) is selected. Then the power control information is output to the base station, and the target receive level gradually increases by the power control of the base station. After reaching the target level, Div_on is switched from a signal to indicate ON to a signal to indicate OFF, and roughly at the same time Means_mode is also switched from a signal to indicate correction NO to a signal to indicate correction YES.

The delay time from the output of Target_sel to the output of Div_on and Means_mode is "τ1", as shown in FIG. 19.

Since the receive diversity function is switched to OFF after the downstream transmission level is sufficiently secured, the transition from "image communication" to "voice communication" can be smoother without interruption.

If the higher layer instructs switching to "image communication" when the mobile terminal 10 is in "voice communication", on the other hand, the signals of Div_on and Means_mode are output first, then the receive diversity function is switched from OFF to ON. Since the receive level remains high for a while, even if the receive diversity function is switched ON, images can be communicated and high quality communication can be assured. After delay time "τ2" elapses, Target_sel is output and the target level is set to the second target level. Then the receive level gradually decreases down to the target level.

In Embodiment 13, the target receive level can be changed to the target receive level sooner, so communication can be assured without interruption. The rest of the configuration is the same as Embodiment 12, so in Embodiment 13, the base station can appropriately perform power control for the mobile terminal 10, and the number of accommodated units can be appropriately increased while maintaining the communication quality.

In Embodiment 13 as well, n number of receive antennas may be used, and weighting may be performed for the output.

INDUSTRIAL APPLICABILITY

The present invention can be preferably used for portable telephones based on a W-CDMA system.

The invention claimed is:
1. A mobile terminal including a plurality of receive antennas, comprising:
    a combine section which combines respective level measurement results of the receive antennas;

a level measurement section which calculates a level measurement value based on the combined measurement result, and outputs the level measurement value as a level measurement result of the mobile terminal; and a correction processing section which corrects the level measurement value calculated by the level measurement section to a level measurement value corresponding to M (1≤M≤N) number of antenna branches, when the number of the receive antennas is N (N>2), and outputs the level measurement value corresponding to one antenna branch as the level measurement result of the mobile terminal.

2. The mobile terminal according to claim 1, further comprising a multiplication section which weights a signal received by the receive antenna, wherein the combine section combines respective the level measurement results of the weighted signals.

3. The mobile terminal according to claim 2, wherein the multiplication section performs different weighting according to a type of each of the receive antennas, or a gain difference between the receive antennas.

4. The mobile terminal according to claim 1, further comprising a selection section which selects one of the corrected level measurement result output from the correction processing section and the uncorrected level measurement result output from the level measurement section, according to a receive environment of the receive antenna.

5. The mobile terminal according to claim 4, wherein the receive environment of the receive antenna is a level of interference in a cell, and the selection section selects the corrected level measurement result when the interference is higher than a predetermined level, and selects the uncorrected level measurement result when the interference is at a predetermined level or less.

6. The mobile terminal according to claim 1, further comprising a control section which turns a receive diversity function ON or OFF according to a type of the receive signal, and selects one of the level measurement result output from the correction processing section and the level measurement result output from the level measurement section.

7. The mobile terminal according to claim 6, wherein a threshold to be used for judging whether the mobile terminal is in an "inside area" or "outside area" is switched, depending on the ON or OFF of the receive diversity function.

8. The mobile terminal according to claim 6, wherein a threshold to be used for judging whether handover is activated is switched, depending on the ON or OFF of the receive diversity function.

9. The mobile terminal according to claim 6, further comprising a power control information generation section which requests a base station for the difference up to a target receive level of the mobile terminal as power control information, depending on the ON or OFF of the receive diversity function based on a service type of communication.

10. The mobile terminal according to claim 6, further comprising a power control information generation section which requests a base station for the difference up to the target receive level of the mobile terminal as power control information, wherein the receive diversity function is turned ON or OFF according to a service type of communication after the request of the power control information.

11. The mobile terminal according to claim 1, further comprising a control section which turns a receive diversity function ON or OFF according to a frequency band to be received, and selects one of the level measurement result output from the correction processing section and the level measurement result output from the level measurement section.

12. The mobile terminal according to claim 1, further comprising a control section which turns a receive diversity function ON or OFF according to a service type of communication, and selects one of the level measurement result output from the correction processing section and the level measurement result output from the level measurement section.

13. A mobile terminal including a plurality of receive antennas, comprising:

a combine section which combines respective level measurement results of the receive antennas;

a level measurement section which calculates a level measurement value based on the combined measurement result, and outputs the level measurement value as a level measurement result of the mobile terminal;

a correction processing section which corrects the level measurement value calculated by the level measurement section to a level measurement value corresponding to M (1≤M≤N) number of antenna branches, when the number of the receive antennas is N (N>2), and outputs the level measurement value corresponding to one antenna branch as the level measurement result of the mobile terminal; and a control section which turns a receive diversity function ON or OFF according to a type of the receive signal, and selects one of the level measurement result output from the correction processing section and the level measurement result output from the level measurement section, wherein the ON or OFF of the receive diversity function, the presence or absence of the correction, a correction coefficient to be used for correction if the correction is performed, and a weight coefficient if weighting is performed for a signal received from receive antenna, is reported to a base station with the level measurement result.

* * * * *